(12) United States Patent
Liu

(10) Patent No.: US 12,353,606 B2
(45) Date of Patent: Jul. 8, 2025

(54) DATA PROCESSING METHOD AND APPARATUS, AND COMPUTER-READABLE STORAGE MEDIUM

(71) Applicant: Shenzhen Yingwang Intelligent Technologies Co., Ltd., Shenzhen (CN)

(72) Inventor: Jianqin Liu, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/344,552

(22) Filed: Jun. 29, 2023

(65) Prior Publication Data

US 2023/0351053 A1     Nov. 2, 2023

Related U.S. Application Data

(63) Continuation of application No. PCT/CN2021/132811, filed on Nov. 24, 2021.

(30) Foreign Application Priority Data

Dec. 31, 2020    (CN) .......................... 202011644482.6
Apr. 15, 2021    (CN) .......................... 202110404844.2

(51) Int. Cl.
     *G06F 21/64*      (2013.01)
     *G01C 21/00*      (2006.01)
     *G06F 16/29*      (2019.01)

(52) U.S. Cl.
     CPC .......... *G06F 21/64* (2013.01); *G01C 21/3841* (2020.08); *G06F 16/29* (2019.01)

(58) Field of Classification Search
None
See application file for complete search history.

(56) References Cited

U.S. PATENT DOCUMENTS

2019/0378356 A1* 12/2019 Fang ...................... G07C 5/008
2020/0272949 A1* 8/2020 Chen ....................... H04W 4/44
2022/0351612 A1   11/2022 Asahara et al.

FOREIGN PATENT DOCUMENTS

| CN | 104811482 A | 7/2015 |
|---|---|---|
| CN | 109872412 A | 6/2019 |
| JP | 6762457 B1 | 9/2020 |

* cited by examiner

Primary Examiner — Cai Y Chen
(74) Attorney, Agent, or Firm — Conley Rose, P.C.

(57) ABSTRACT

A map cloud allocates an identification code to a vehicle, maintains a correspondence between the identification code and a data processing manner, and sends the identification code to the vehicle. When reporting data, the vehicle reports the identification code allocated to the vehicle, that is, identifies the corresponding processing manner of the data by using the identification code, so that after receiving a data report message reported by the vehicle, the map cloud can quickly determine the data processing manner by using the identification code included in the data report message.

30 Claims, 15 Drawing Sheets

DATA PROCESSING METHOD AND APPARATUS, AND COMPUTER-READABLE STORAGE MEDIUM

CROSS-REFERENCE TO RELATED APPLICATIONS

This is a continuation of International Patent Application No. PCT/CN2021/132811 filed on Nov. 24, 2021, which claims priority to Chinese Patent Application No. 202011644482.6 filed on Dec. 31, 2020 and Chinese Patent Application No. 202110404844.2 filed on Apr. 15, 2021. The disclosures of the aforementioned applications are hereby incorporated by reference in their entireties.

TECHNICAL FIELD

This application relates to the field of autonomous driving technologies, and in particular, to a data processing method and apparatus, and a computer-readable storage medium.

BACKGROUND

Autonomous driving is a mainstream application in the field of artificial intelligence. The autonomous driving technology relies on collaboration of a global positioning system and a monitoring apparatus such as computer vision, radar, to implement autonomous driving of a motor vehicle without manual active operation. An autonomous vehicle uses various computing systems to transport passengers from one location to another location. Some autonomous vehicles may need some initial or continuous inputs from an operator (such as a driver or a passenger). The autonomous vehicle allows the operator to switch from a manual driving mode to an autonomous driving mode or an assistance driving mode between the manual driving mode and the autonomous driving mode. The autonomous driving technology can effectively avoid driving errors of human drivers, reduce traffic accidents, and improve highway transportation efficiency. Therefore, the autonomous driving technology attracts increasing attention.

Generally, high-precision maps are used to implement L3 autonomous driving (conditionally autonomous driving). Data collection in a conventional high-precision map production process depends on sensors such as optical radar, cameras, and high-precision combined inertial navigation sensors. In addition, a map obtaining party needs to have specific surveying and mapping qualifications and professional surveying and mapping capabilities. Therefore, data collection, processing, and maintenance costs are high. With continuous construction of roads, an update of high-precision maps is more important than initial production of the maps. A conventional map obtaining method cannot meet a high-precision map update requirement due to factors such as costs.

Currently, a high-precision map may be updated in a crowdsourcing data collection manner. An implementation process of the crowdsourcing data collection manner may be described as follows: A server obtains perception data reported by a crowdsourcing vehicle, and then determines, based on the obtained perception data, a difference between a real situation and an existing high-precision map, to update the high-precision map based on the difference. Crowdsourcing vehicles are widely sourced and large in number. After obtaining perception data reported by each vehicle, the server does not distinguish between data sources of the vehicles, and generally updates a high-precision map based on perception data reported by all vehicles. Therefore, data security and reliability cannot be ensured.

SUMMARY

This application provides a data processing method and apparatus, and a computer-readable storage medium, to improve security and reliability of data used to generate a high-precision map.

It should be noted that, in embodiments provided in this application, there may be a plurality of possible implementations for an execution sequence of steps, and some or all of the steps may be performed sequentially or in parallel.

According to a first aspect, a data processing method is provided. The method may include the following steps: receiving vehicle type indication information from a vehicle side, where the vehicle type indication information indicates a type of a first vehicle; and the vehicle side may include a vehicle, or may include a vehicle and a vehicle cloud (usually a vehicle server deployed by a vehicle factory); allocating an identification code to the first vehicle based on the vehicle type indication information, where the identification code is associated with a processing manner for first perception data reported by the first vehicle, and the processing manner may be determined based on the vehicle type indication information before the identification code is allocated; sending the identification code to the vehicle side; receiving a perception data report message from the vehicle side, where the perception data report message includes the first perception data reported by the first vehicle and the identification code; and processing the first perception data in the processing manner associated with the identification code. The foregoing method may be applied to the following application scenarios: In scenario 1, a map cloud (usually a map server deployed by a map service provider) directly performs information exchange with a vehicle; and in scenario 2, a map cloud performs information exchange with a vehicle by using a vehicle cloud. When the map cloud directly performs information exchange with the vehicle, the foregoing method is performed by the map cloud, and the vehicle side is the first vehicle (solution 1). When the map cloud performs information exchange with the vehicle by using the vehicle cloud, the foregoing method is performed by the map cloud, and the vehicle side is the vehicle cloud (solution 2).

During implementation of this embodiment of this application, the map cloud allocates the identification code to the vehicle, and maintains a correspondence between the identification code and a data processing manner, to quickly determine a processing manner for received crowdsourcing collected data, perform different processing on data from different types of vehicles, and improve data security and reliability.

In a possible implementation, the processing manner includes: setting a confidence level of the first perception data to a first confidence level, where the first confidence level is associated with the identification code; or determining that a usage priority of the first perception data is a first priority, where the first priority is associated with the identification code.

In a possible implementation, the identification code uniquely identifies the first vehicle, and that the identification code is associated with the processing manner includes: storing a correspondence between the identification code and the processing manner.

In a possible implementation, the processing manner is a first type of processing manner in a plurality of types of processing manners, and that the identification code is associated with the processing manner includes: The identification code indicates the first type of processing manner.

In a possible implementation, the vehicle type indication information includes at least one of the following content: attribute information of the first vehicle; holder information of the first vehicle; a model or a configuration parameter of a data collection apparatus in the first vehicle; a model or a configuration parameter of a data processing apparatus in the first vehicle; or a data type supported by the first vehicle for reporting. For example, the attribute information may be information that can indicate whether the first vehicle is a registered crowdsourcing data collection vehicle or a vehicle that is not registered with the map service provider. For another example, the attribute information may be information that can indicate whether the first vehicle is a vehicle managed by a travel company or the map service provider in a unified manner or a social idle vehicle. The attribute information may alternatively be described from another perspective. This is not limited in the present application.

In a possible implementation, the first vehicle is a registered crowdsourcing data collection vehicle, and the vehicle type indication information includes at least one piece of the following information: a model of a crowdsourcing data collection unit; a model of a crowdsourcing data processing unit; a capability of the crowdsourcing data collection unit; a capability of the crowdsourcing data processing unit; an identifier of a company to which the first vehicle belongs; identity information of an individual to which the first vehicle belongs; an identifier of a manufacturer of the first vehicle; or a value generated between a cloud and the company according to a predefined rule.

In a possible implementation, the first vehicle is the registered crowdsourcing data collection vehicle, the first confidence level is higher than a confidence level of perception data reported by an unregistered data collection vehicle, and the first priority is higher than a priority of the perception data reported by the unregistered data collection vehicle. During implementation of this embodiment of this application, because the first perception data has the foregoing characteristics, updating a high-precision map by using the first perception data can ensure accuracy of the high-precision map.

In a possible implementation, the first vehicle is an unregistered data collection vehicle, and the receiving vehicle type indication information from a vehicle side includes: receiving a registration request message from the vehicle side, where the registration request message includes the vehicle type indication information.

According to a second aspect, an embodiment of this application provides a data processing method. The method may include the following steps: sending vehicle type indication information to a server side; receiving an identification code from the server side, where the identification code is associated with a processing manner for perception data reported by a first vehicle; and sending a perception data report message to the server side, where the perception data report message includes first perception data reported by the first vehicle and the identification code.

The foregoing method may be applied to the following application scenario: In scenario 1, a map cloud directly performs information exchange with a vehicle; or in scenario 2, a map cloud performs information exchange with a vehicle by using a vehicle cloud. When the map cloud directly performs information exchange with the vehicle, the foregoing method is performed by the first vehicle, and the server side is the map cloud (solution 3). When the map cloud performs information exchange with the vehicle by using the vehicle cloud, the foregoing method is performed by the first vehicle, and the server side is the vehicle cloud (solution 4). When the map cloud performs information exchange with the vehicle by using the vehicle cloud, the foregoing method may alternatively be performed by the vehicle cloud, and the server side is the map cloud (solution 5).

During implementation of this embodiment of this application, the map cloud allocates the identification code to the vehicle, and maintains a correspondence between the identification code and a data processing manner, to quickly determine a processing manner for received crowdsourcing collected data, perform different processing on data from different types of vehicles, and improve data security and reliability.

In a possible implementation, the foregoing processing manner includes: setting a confidence level of the first perception data to a first confidence level, where the first confidence level is associated with the identification code; or determining that a usage priority of the first perception data is a first priority, where the first priority is associated with the identification code.

In a possible implementation, the identification code uniquely identifies the first vehicle.

In a possible implementation, the processing manner is a first type of processing manner in a plurality of types of processing manners, and that the identification code is associated with a processing manner for perception data reported by the first vehicle includes: The identification code indicates the first type of processing manner.

In a possible implementation, the vehicle type indication information includes at least one of the following content: attribute information of the first vehicle; holder information of the first vehicle; a model or a configuration parameter of a data collection apparatus in the first vehicle; a model or a configuration parameter of a data processing apparatus in the first vehicle; or a data type supported by the first vehicle for reporting. For example, the attribute information may be information that can indicate whether the first vehicle is a registered crowdsourcing data collection vehicle or a vehicle that is not registered with a map service provider. For another example, the attribute information may be information that can indicate whether the first vehicle is a vehicle managed by a travel company or a map service provider in a unified manner or a social idle vehicle. The attribute information may alternatively be described from another perspective. This is not limited in the present application.

In a possible implementation, the first vehicle is a registered crowdsourcing data collection vehicle, and the vehicle type indication information includes at least one piece of the following information: a model of a crowdsourcing data collection unit; a model of a crowdsourcing data processing unit; a capability of the crowdsourcing data collection unit; a capability of the crowdsourcing data processing unit; an identifier of a company to which the first vehicle belongs; identity information of an individual to which the first vehicle belongs; an identifier of a manufacturer of the first vehicle; or a value generated between a cloud and the company according to a predefined rule.

In a possible implementation, the first vehicle is the registered crowdsourcing data collection vehicle, the first confidence level is higher than a confidence level of perception data reported by an unregistered data collection vehicle, and the first priority is higher than a priority of the perception data reported by the unregistered data collection vehicle.

In a possible implementation, the first vehicle is an unregistered data collection vehicle, and that the first vehicle sends the vehicle type indication information to the server side includes: sending a registration request message to the server side, where the registration request message includes the vehicle type indication information.

According to a third aspect, an embodiment of this application provides a data processing apparatus. The data processing apparatus may include a receiving module, a processing module, and a sending module. The receiving module is configured to receive vehicle type indication information from a vehicle side, where the vehicle type indication information indicates a type of a first vehicle. The processing module is configured to allocate an identification code to the first vehicle based on the vehicle type indication information. The identification code is associated with a processing manner for first perception data reported by the first vehicle. The processing manner may be determined based on the vehicle type indication information before the identification code is allocated. The sending module is configured to send the identification code to the vehicle side. The receiving module is further configured to receive a perception data report message from the vehicle side, where the perception data report message includes the first perception data reported by the first vehicle and the identification code. The processing module is further configured to process the first perception data in the processing manner associated with the identification code.

In a possible implementation, the processing manner includes: setting a confidence level of the first perception data to a first confidence level, where the first confidence level is associated with the identification code; or determining that a usage priority of the first perception data is a first priority, where the first priority is associated with the identification code.

In a possible implementation, the identification code uniquely identifies the first vehicle, and that the identification code is associated with the processing manner includes: storing an association relationship between the identification code and the processing manner.

In a possible implementation, the processing manner is a first type of processing manner in a plurality of types of processing manners, and that the identification code is associated with the processing manner includes: The identification code indicates the first type of processing manner.

In a possible implementation, the vehicle type indication information includes at least one of the following content: attribute information of the first vehicle; holder information of the first vehicle; a model or a configuration parameter of a data collection apparatus in the first vehicle; a model or a configuration parameter of a data processing apparatus in the first vehicle; or a data type supported by the first vehicle for reporting.

In a possible implementation, the first vehicle is a registered crowdsourcing data collection vehicle, and the vehicle type indication information includes at least one piece of the following information: a model of a crowdsourcing data collection unit; a model of a crowdsourcing data processing unit; a capability of the crowdsourcing data collection unit; a capability of the crowdsourcing data processing unit; an identifier of a company to which the first vehicle belongs; identity information of an individual to which the first vehicle belongs; an identifier of a manufacturer of the first vehicle; or a value generated between a cloud and the company according to a predefined rule.

In a possible implementation, the first vehicle is the registered crowdsourcing data collection vehicle, the first confidence level is higher than a confidence level of perception data reported by an unregistered data collection vehicle, and the first priority is higher than a priority of the perception data reported by the unregistered data collection vehicle.

In a possible implementation, the first vehicle is an unregistered data collection vehicle, and the receiving module is specifically configured to receive a registration request message from the vehicle side, where the registration request message includes the vehicle type indication information.

According to a fourth aspect, an embodiment of this application provides a data processing apparatus. The data processing apparatus may include a sending module and a receiving module. The sending module is configured to send vehicle type indication information to a server side. The receiving module receives an identification code from the server side, where the identification code is associated with a processing manner for perception data reported by a first vehicle. The sending module is further configured to send a perception data report message to the server side, where the perception data report message includes first perception data reported by the first vehicle and the identification code.

In a possible implementation, the processing manner includes: setting a confidence level of the first perception data to a first confidence level, where the first confidence level is associated with the identification code; or determining that a usage priority of the first perception data is a first priority, where the first priority is associated with the identification code.

In a possible implementation, the identification code uniquely identifies the first vehicle.

In a possible implementation, the processing manner is a first type of processing manner in a plurality of types of processing manners, and that the identification code is associated with a processing manner for perception data reported by a first vehicle includes: The identification code indicates the first type of processing manner.

In a possible implementation, the vehicle type indication information includes at least one of the following content: attribute information of the first vehicle; holder information of the first vehicle; a model or a configuration parameter of a data collection apparatus in the first vehicle; a model or a configuration parameter of a data processing apparatus in the first vehicle; or a data type supported by the first vehicle for reporting.

In a possible implementation, the vehicle type indication information includes at least one piece of the following information: a model of a crowdsourcing data collection unit; a model of a crowdsourcing data processing unit; a capability of the crowdsourcing data collection unit; a capability of the crowdsourcing data processing unit; an identifier of a company to which the first vehicle belongs; identity information of an individual to which the first vehicle belongs; an identifier of a manufacturer of the first vehicle; or a value generated between a cloud and the company according to a predefined rule.

In a possible implementation, the first vehicle is a registered crowdsourcing data collection vehicle, the first confidence level is higher than a confidence level of perception data reported by an unregistered data collection vehicle, and the first priority is higher than a priority of the perception data reported by the unregistered data collection vehicle.

In a possible implementation, the first vehicle is an unregistered data collection vehicle, and the sending module is specifically configured to send a registration request message to the server side, where the registration request message includes the vehicle type indication information.

According to a fifth aspect, an embodiment of this application provides another data processing apparatus. The data processing apparatus may include a memory and a processor. The memory is configured to store a computer program, and the processor executes the computer program to perform the method according to any one of the first aspect or the implementations of the first aspect.

According to a sixth aspect, an embodiment of this application provides another data processing apparatus. The data processing apparatus may include a memory and a processor. The memory is configured to store a computer program, and the processor executes the computer program to perform the method according to any one of the second aspect or the implementations of the second aspect.

Based on solution 1 in scenario 1 and solution 2 in scenario 2 described in the descriptions of the first aspect, the data processing apparatuses in the third aspect and the fifth aspect may be singly deployed map servers, or may be a plurality of distributedly deployed map servers, or may be components or chips in a map server. Based on solution 3 in scenario 1 and solution 4 and solution 5 in scenario 2 described in the descriptions of the second aspect, the data processing apparatuses in the fourth aspect and the sixth aspect may be vehicles, or components or chips in a vehicle (for solution 3), or may be vehicle servers, or components or chips in a vehicle server (for solution 4 and solution 5).

According to a seventh aspect, an embodiment of this application further provides a computer-readable storage medium. The computer storage medium stores a computer program. The computer program includes program instructions. When the program instructions are executed by a processor, the processor performs the method according to any one of the first aspect or the implementations of the first aspect.

According to an eighth aspect, an embodiment of this application further provides a computer-readable storage medium. The computer storage medium stores a computer program. The computer program includes program instructions. When the program instructions are executed by a processor, the processor performs the method according to any one of the second aspect or the implementations of the second aspect.

According to a ninth aspect, an embodiment of this application further provides a computer program product. When the computer program product is run on a processor, the method according to any one of the first aspect or the implementations of the first aspect is performed.

According to a tenth aspect, an embodiment of this application further provides a computer program product. When the computer program product is run on a processor, the method according to any one of the second aspect or the implementations of the second aspect is performed.

DESCRIPTION OF EMBODIMENTS

Figure 1A:
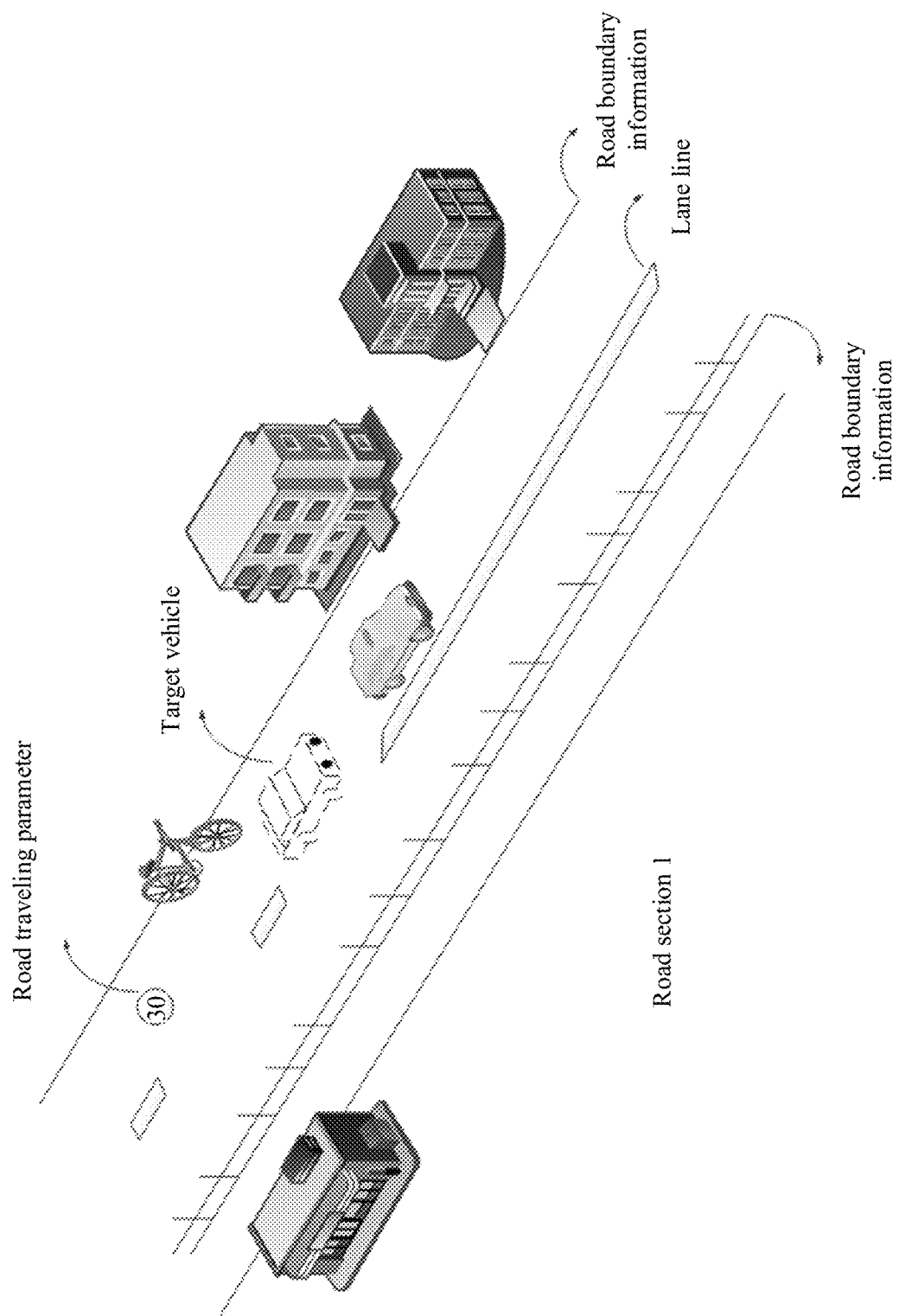
FIG. 1A, FIG. 1B, FIG. 1C, and FIG. 1D are schematic diagrams of a high-precision map according to an embodiment of this application.

The following clearly and completely describes technical solutions in embodiments of this application with reference to accompanying drawings. It is clear that the described embodiments are only some but not all embodiments of this application.

In the specification and accompanying drawings of this application, the terms "first", "second", and the like are intended to distinguish between different objects or to distinguish between different processing of a same object but do not indicate a particular order of the objects. In addition, the terms "including", "having", or any other variant thereof mentioned in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in embodiments of this application, the word "example" or "for example" represents giving an example, an illustration, or a description. Any embodiment or design method described as an "example" or "for example" in embodiments of this application should not be explained as being more preferred or having more advantages than another embodiment or design scheme. Exactly, use of the word "example", "for example", or the like, is intended to present a relative concept in a specific manner. In embodiments of this application, "A and/or B" represents two meanings: A and B, and A or B. "A, and/or B, and/or C" represents any one of A, B, and C, or represents any two of A, B, and C, or represents A, B, and C.

For ease of understanding of the technical solutions described in this application, the following describes some terms in this application.

(1) An autonomous vehicle, also referred to as a self-driving vehicle, an intelligent driving vehicle, a computer driving vehicle, or a wheeled mobile robot, is an intelligent vehicle that implements self-driving by using a computer system. During actual application, through collaboration of artificial intelligence, a monitoring apparatus (a visual sensor, radar, and the like), and a global positioning system, the autonomous vehicle enables a computer device to automatically and safely operate a motor vehicle without any active operation from a human being.

(2) A high-precision map is generally an electronic map with higher precision, more data dimensions, and higher real-time performance. The higher precision is reflected in that the high-precision map can be accurate to a lane level or even a centimeter level. The more data dimensions are reflected in that the high-precision map is richer in map elements and information about map elements. The higher real-time performance is reflected in that an update frequency of the high-precision map is greatly improved compared with that of a conventional navigation map. Specifically, the high-precision map may include a static layer, or may include a dynamic layer. For example, information carried by the static layer may be a connection relationship between roads, a location of a lane line, a quantity of lane lines, and other objects around a road. For another example, information carried by the static layer may be traffic sign information (for example, a location and a height of a traffic light, and content of signs such as a speed limit sign, a winding road sign, and a slow sign), and information about trees and buildings around a road. For example, information carried by the dynamic layer includes dynamic traffic information or a dynamic event, and the information may be associated with a time point (or a time period), or may be irrelevant to a time point (or a time period). In some implementations, a format of dynamic layer information may be a timestamp+a road section+information, for example, weather information of a road section 1 at a moment or in a time period, and road surface information (for example, a road interruption status, a road maintenance status, a road littering status, or a road water accumulation status) of road section 1 at the moment or in the time period.

In this embodiment of this application, a user of the high-precision map is usually a vehicle with an autonomous driving capability.

Figure 1B:
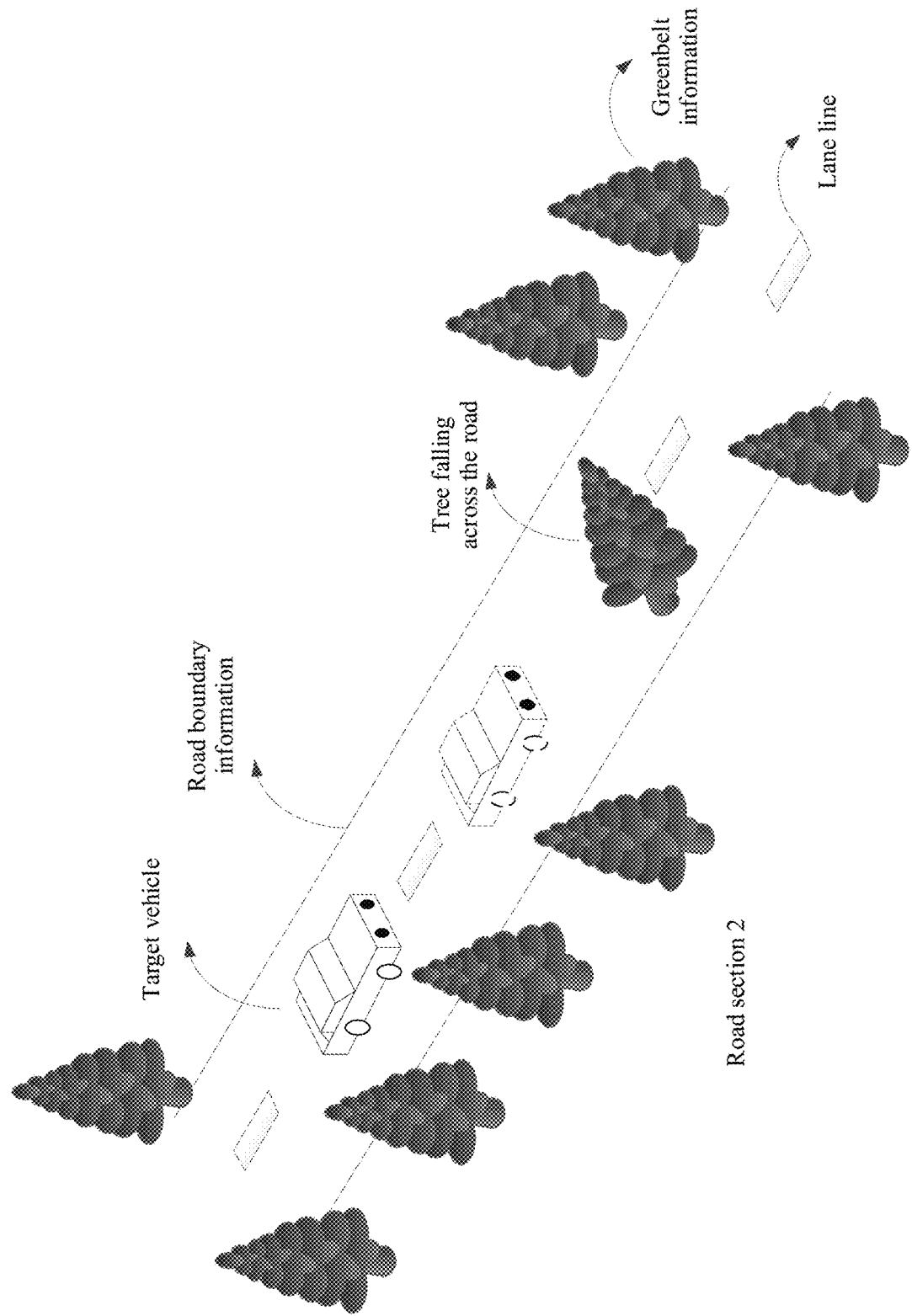
Figure 1C:
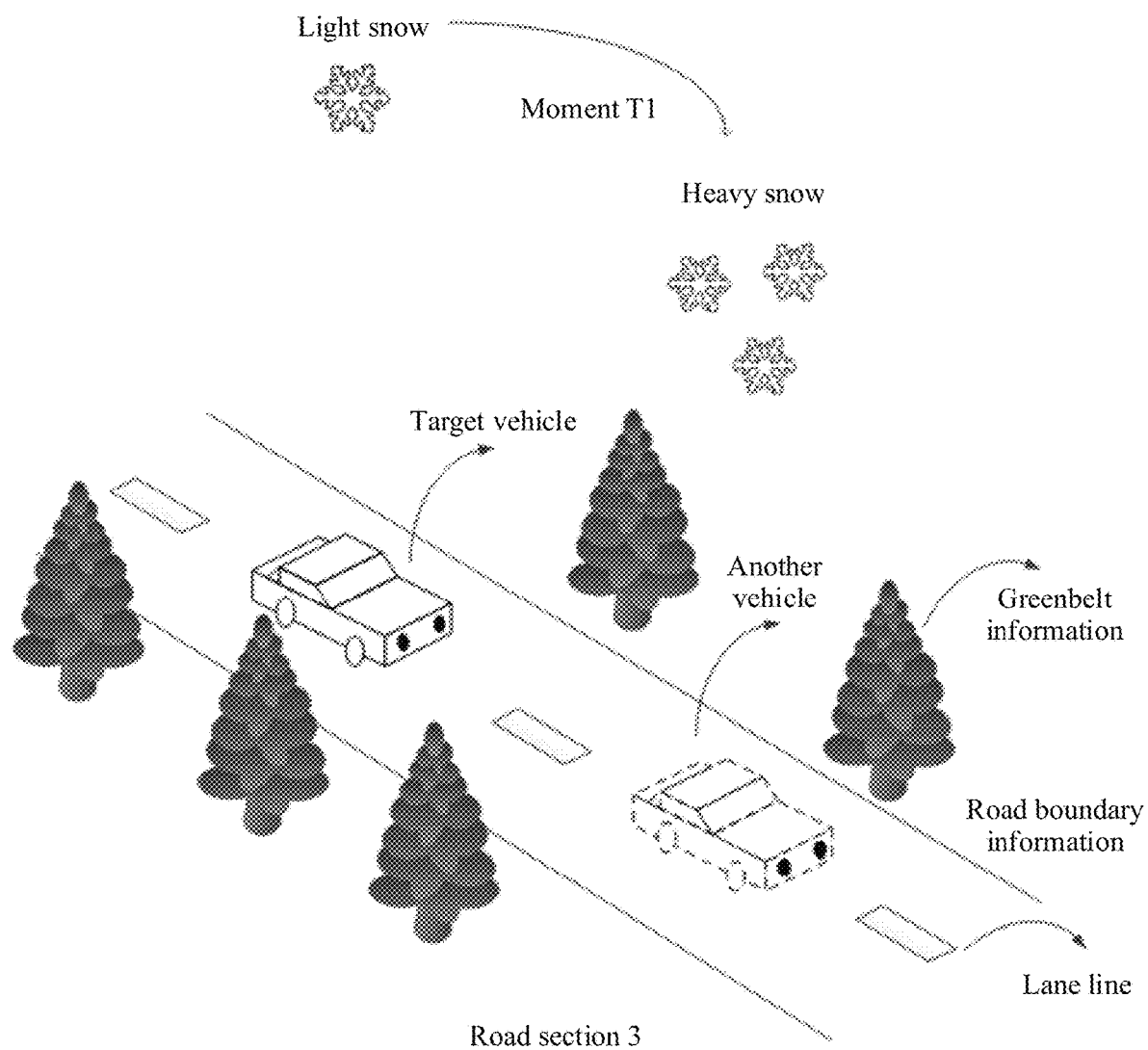
Figure 1D:
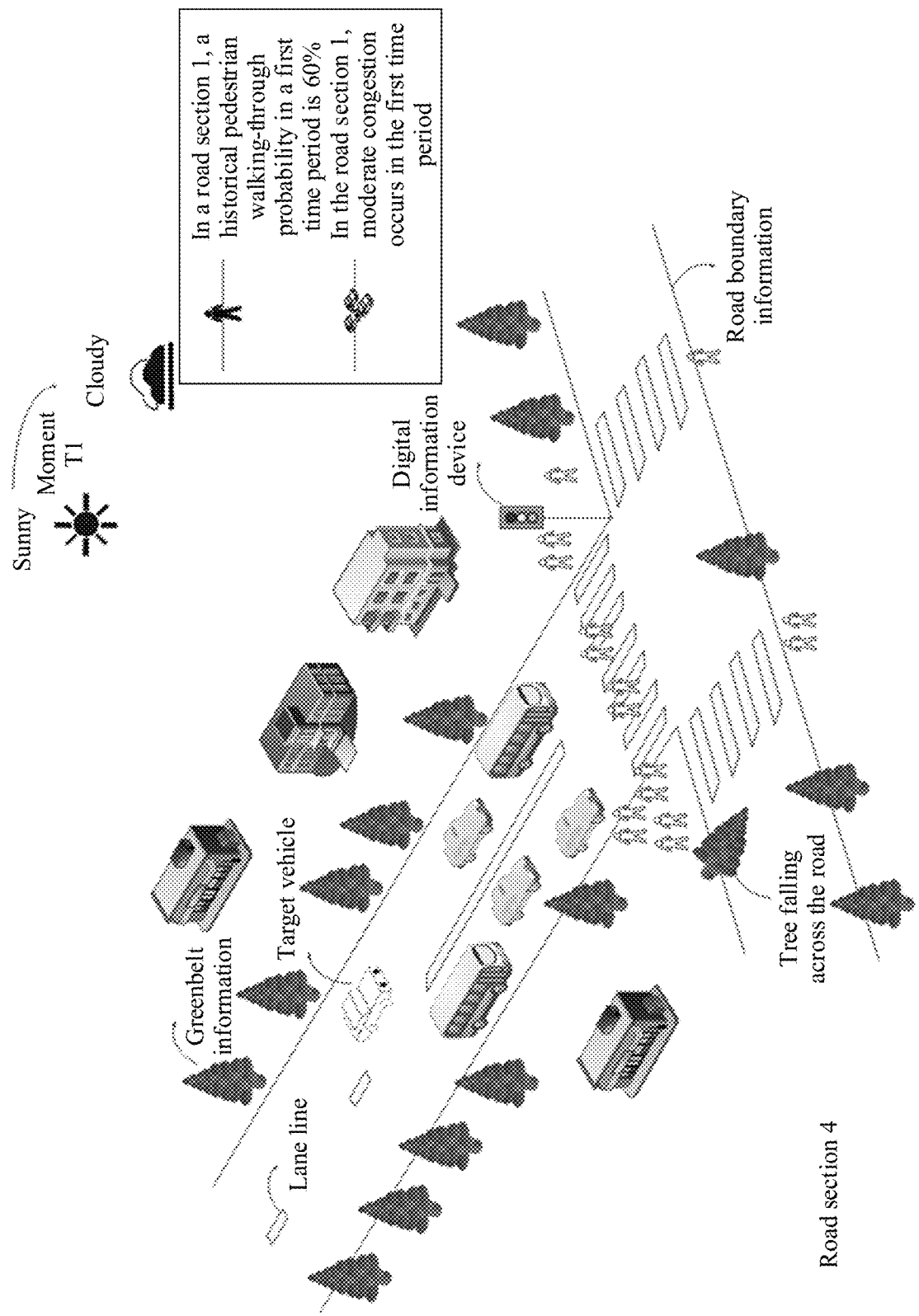

In this embodiment of this application, FIG. 1A to FIG. 1D are schematic diagrams of a high-precision map according to an embodiment of this application. A road section 1 is used as an example. As shown in FIG. 1A, a high-precision map includes static layer information such as lane line information, a lane quantity, road boundary information, and a road traveling parameter. A road section 2 is used as an example. As shown in FIG. 1B, a high-precision map includes static layer information such as lane line information, a lane quantity, road boundary information, and green belt information, and further includes dynamic layer information such as a tree that falls across a road surface. A road section 3 is used as an example. As shown in FIG. 1C, a high-precision map includes static layer information such as lane line information, a lane quantity, road boundary information, and green belt information, and further includes dynamic layer information such as weather information (for example, at a time point T1, light snow to heavy snow). A road section 4 is used as an example. As shown in FIG. 1D, a high-precision map includes static layer information such as lane line information, a lane quantity, road boundary information, green belt information, and a digital information device, and further includes dynamic layer information such as weather information (at a time point T1, sunny to overcast), a historical pedestrian and non-motor vehicle walking-through probability of 60%, and moderate congestion.

A high-precision map can effectively overcome a perception defect of a conventional hardware sensor. For example, data obtained by a sensor is limited, a detection range of the sensor is limited, and sensor detection is easily affected by an environment.

The following describes application scenarios of embodiments of this application. It should be noted that the application scenarios described in this application are intended to describe the technical solutions in this application more clearly, but are not intended to limit the technical solutions provided in this application. A person of ordinary skill in the art may know that as a system architecture evolves and a new application scenario emerges, the technical solutions provided in this application are also applied to a similar technical problem.

Figure 2:
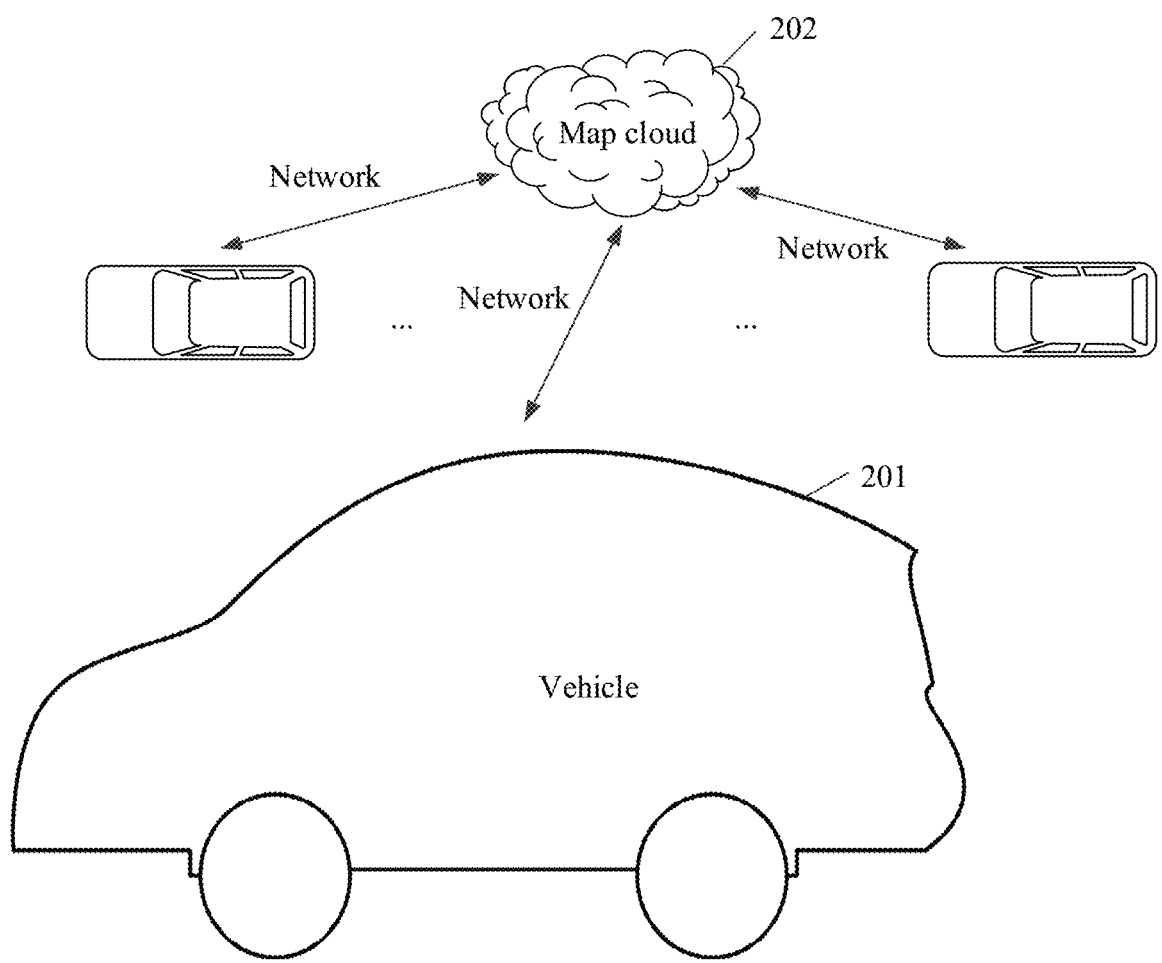
FIG. 2 is a schematic diagram of a first application scenario according to an embodiment of this application.

FIG. 2 is a schematic diagram of a first application scenario according to an embodiment of this application. As shown in FIG. 2, in this application scenario, a vehicle 201 may directly communicate with a map cloud 202 in a wired or wireless manner.

In some embodiments, the vehicle 201 may send vehicle type indication information to the map cloud 202. For example, the vehicle type indication information may include at least one of the following content: attribute information of the vehicle; holder information of the vehicle; a model or a configuration parameter of a data collection apparatus in the vehicle; a model or a configuration parameter of a data processing apparatus in the vehicle; and a data type supported by the vehicle for reporting. After receiving the vehicle type indication information, the map cloud 202 may determine, based on the vehicle type indication information reported by the vehicle 201, a processing manner for perception data reported by the vehicle, and allocate an identification code to the vehicle 201. The identification code is associated with the processing manner. Then, the map cloud 202 sends the identification code to the vehicle 101, so that the vehicle 201 may receive the identification code sent by the map cloud 202. When the vehicle 201 sends a perception data report message to the map cloud, the perception data report message includes first perception data and the identification code that are obtained by the vehicle, so that the map cloud 202 may process, based on the processing manner corresponding to the identification code, the first perception data reported by the vehicle 201. In some embodiments, the map cloud processes, in the processing manner associated with the identification code, the first perception data reported by the vehicle, to update a high-precision map based on the first perception data.

In some embodiments, the map cloud 202 may run, by using multi-dimensional data included in the high-precision map, a program that is stored in the map cloud 202 and that is related to vehicle autonomous driving control, to control the vehicle 201 (for example, indicate, by using a driving policy, how to drive the vehicle).

In some embodiments, the map cloud 202 may implement key configuration and management. For example, the vehicle 201 may encrypt the first perception data based on a key from the map cloud 202, to obtain the encrypted first perception data; and then report the encrypted first perception data to the map cloud 202, so that the map cloud 202 may decrypt the encrypted first perception data based on the key.

In some embodiments, the cloud server indicates the autonomous vehicle how to travel in a given scenario. After obtaining map layer information used to describe a road section (for example, a first road section) in which the vehicle 201 travels, the map cloud 202 specifies a driving policy for the autonomous vehicle based on the map layer information, and sends the driving policy to the autonomous vehicle. For example, it is determined, by using dynamic layer information, that an obstacle exists in front of the autonomous vehicle, and the autonomous vehicle is notified of how to bypass the obstacle. For another example, a water accumulation status of a road area is determined by using the dynamic layer information, and the autonomous vehicle is notified of how to drive on a water-logged road surface. For another example, the cloud server may determine, based on the map layer information of the first road section, that a temporary stop sign exists in front of the road, and notify the autonomous vehicle that the autonomous vehicle may temporarily stop at a corresponding location based on a requirement.

Figure 3:
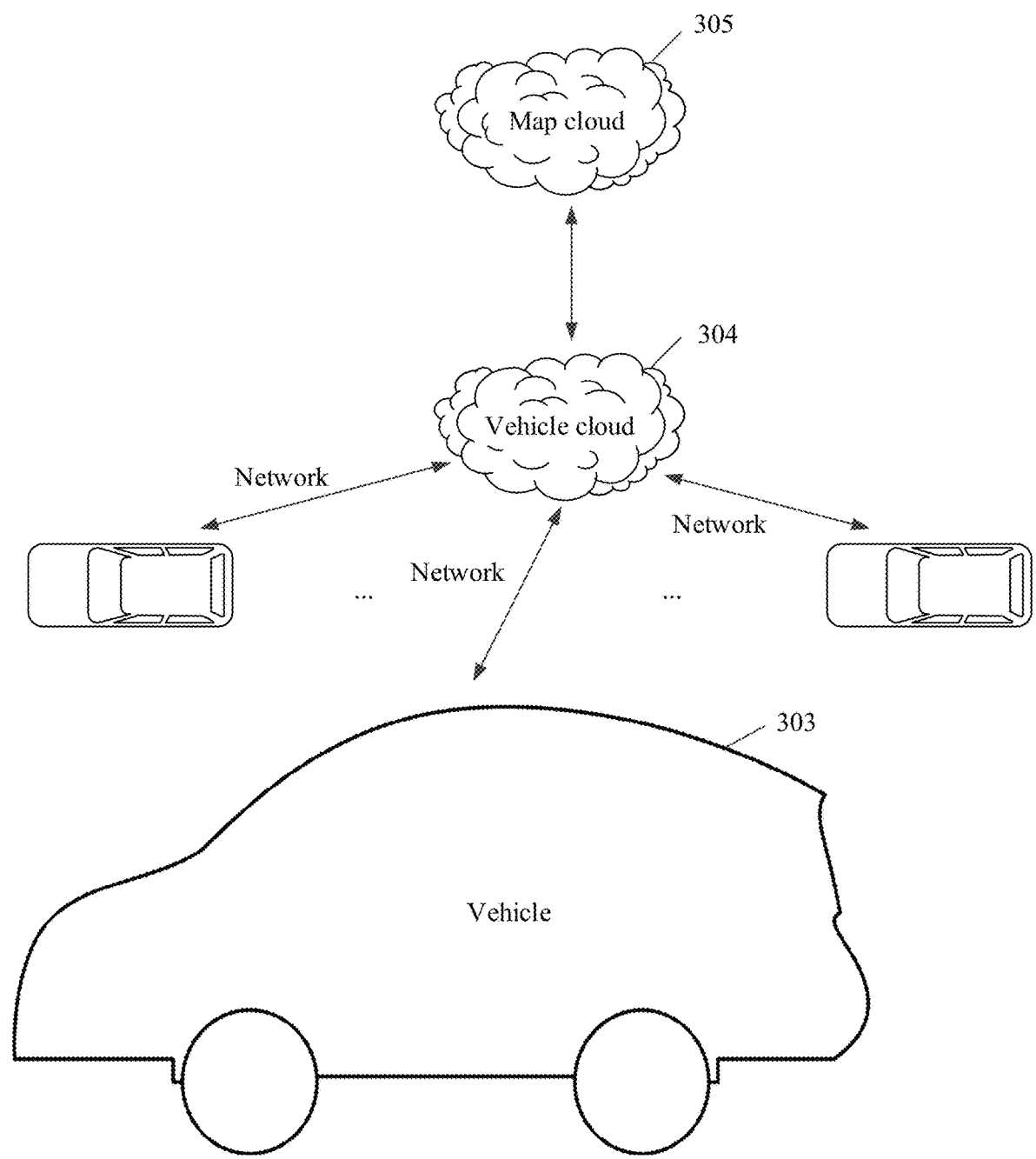
FIG. 3 is a schematic diagram of a second application scenario according to an embodiment of this application.

FIG. 3 is a schematic diagram of a second application scenario according to an embodiment of this application. As shown in FIG. 3, in the application scenario, a vehicle 303 may directly communicate with a vehicle cloud 304 in a wired or wireless manner, and the vehicle cloud 304 may directly communicate with a map cloud 305 in a wired or wireless manner. For the vehicle 303 and the map cloud 305, the vehicle 303 may indirectly communicate with the map cloud 305 by using the vehicle cloud 304.

In some embodiments, the vehicle 303 may send vehicle type indication information to the vehicle cloud 304. For example, the vehicle type indication information may include at least one of the following content: attribute information of the vehicle; holder information of the vehicle; a model or a configuration parameter of a data collection apparatus in the vehicle; a model or a configuration parameter of a data processing apparatus in the vehicle; and a data type supported by the first vehicle for reporting. After receiving the vehicle type indication information, the vehicle cloud 304 may forward the vehicle type indication information to the map cloud 305, so that the map cloud 305 may determine, based on the vehicle type indication information reported by the vehicle 303, a processing manner for perception data reported by the vehicle, and allocate an identification code to the vehicle 303. The identification code is associated with the processing manner. Specifically, the map cloud 305 sends the identification code to the vehicle cloud 304, and then the vehicle cloud 304 forwards the identification code to the vehicle 303, so that the vehicle 303 may receive the identification code sent by the map cloud 305. When the vehicle 303 sends a perception data report message to the vehicle cloud 304, where the perception data report message includes first perception data and the identification code that are obtained by the vehicle, and the vehicle cloud 304 forwards the perception data report message to the map cloud 305, so that the map cloud 305 may process, in the processing manner corresponding to the identification code, the first perception data reported by the vehicle 303. In some embodiments, after processing, based on the processing manner associated with the identification code, the first perception data reported by the vehicle, the map cloud 305 may update a high-precision map based on the first perception data.

In some embodiments, the vehicle cloud 304 may implement key configuration and management. For example, the vehicle 303 may encrypt the first perception data based on a key from the vehicle cloud 304, to obtain encrypted first perception data; and then report the encrypted first perception data to the vehicle cloud 304, so that the vehicle cloud 304 may decrypt the encrypted first perception data based on the key. When the vehicle cloud 304 forwards the encrypted first perception data to the map cloud 305, because a communication connection is established between the vehicle cloud 304 and the map cloud 305, the vehicle cloud 304 may assist the map cloud 305 in decrypting the first perception data.

Figure 4:
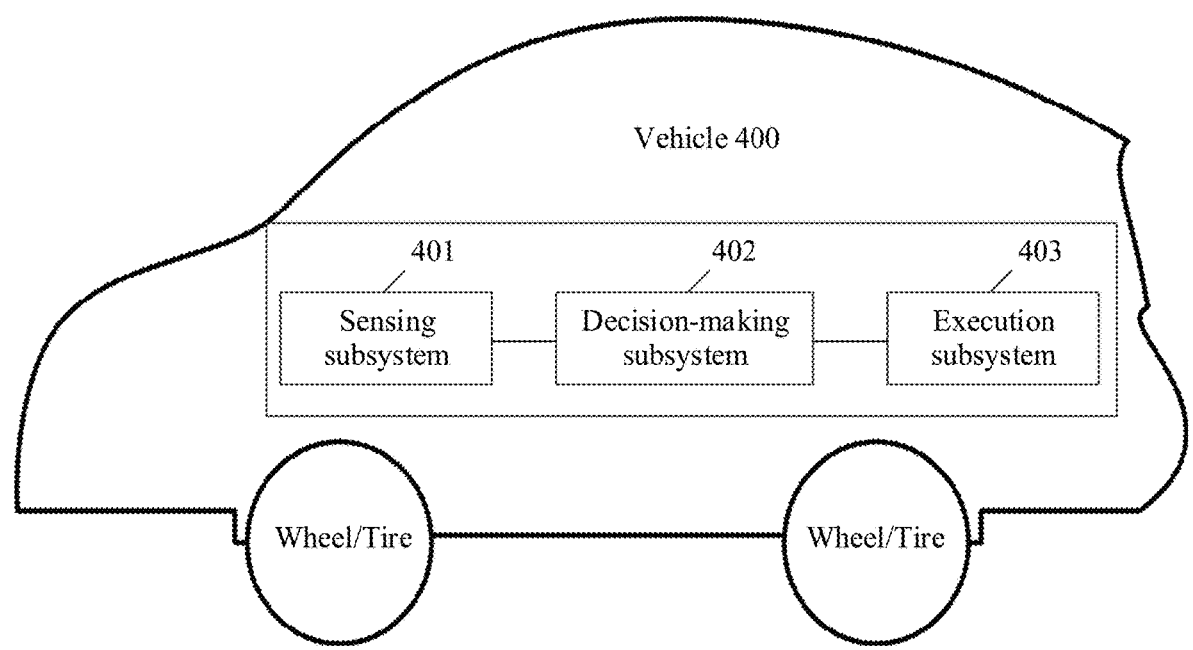
FIG. 4 is a functional block diagram of a vehicle 400 according to an embodiment of this application.

To better understand the foregoing application scenario, the following describes a vehicle 400 in an embodiment of this application with reference to FIG. 4. In some implementations, the vehicle 400 may be configured to be in a fully autonomous driving mode, a partially autonomous driving mode, or a manual driving mode. Autonomous driving classification proposed by the SAE is used as an example. The fully autonomous driving mode may be L5, and indicates that a vehicle completes all driving operations, and a human driver does not need to keep attention. Partially autonomous driving modes may be L1, L2, L3, and L4, where L1 indicates that a vehicle provides one of the following driving operations: steering and acceleration and deceleration, and a human driver is responsible for remaining driving operations; L2 indicates that a vehicle provides a plurality of the following driving operations: steering and acceleration and deceleration, and a human driver is responsible for remaining driving actions; L3 indicates that a vehicle completes most driving operations, and a human driver needs to keep attention focused in case of emergency; and L4 indicates that a vehicle completes all driving operations, and a human driver does not need to keep attention, but a road and an environment condition are limited. The manual driving mode may be L0, and indicates that a human driver is fully responsible for driving.

In this embodiment of this application, the vehicle 400 may include at least the following subsystems: a sensing subsystem 401, a decision-making subsystem 402, and an execution subsystem 403. The sensing subsystem 401 may include at least a sensor. Specifically, the sensor may include an internal sensor and an external sensor. The internal sensor is configured to monitor a status of the vehicle, and may include at least one of a vehicle speed sensor, an acceleration sensor, an angular velocity sensor, and the like. The external sensor is mainly configured to monitor an external environment around the vehicle. For example, the external sensor may include a visual sensor and a radar sensor. The visual sensor monitors image data of an environment around the vehicle by obtaining the image data. The radar sensor detects data such as a distance between a surrounding object and the vehicle and a shape of the surrounding object by transmitting an electromagnetic wave and then receiving the electromagnetic wave reflected by the surrounding object.

For example, a plurality of radar sensors are distributed outside the entire vehicle 400. Some of the plurality of radar sensors are coupled to a front of the vehicle 400 to position an object in front of the vehicle 400. One or more other radar sensors may be located at a rear of the vehicle 400 to position an object behind the vehicle 400. Other radar sensors may be located on two sides of the vehicle 400 to locate objects approaching the vehicle 400 from the two sides.

For another example, a LIDAR sensor is installed in a rotation structure on a top of the vehicle 400, and the LIDAR sensor can sense an object around the vehicle 400 through 360-degree rotation.

For another example, a camera, a video camera, or another image sensor may be installed on the vehicle 400, to capture an image as the vehicle 400 moves.

For another example, a Global Positioning System (GPS) sensor may be located on the vehicle 400, to provide a controller with geographical location coordinates of the vehicle 400 and generation time of the coordinates. The GPS includes an antenna configured to receive a GPS satellite signal and a GPS receiver coupled to the antenna.

The decision-making subsystem 402 may include at least an electronic control unit (ECU), a map database, and an object database. Specifically, the ECU, also referred to as a "trip computer", a "vehicle-mounted computer", or the like, is a microcomputer controller dedicated to a vehicle. The ECU is connected to a bus, and communicates with another device through the bus. For example, the ECU may obtain information transmitted by a sensor, map data, or a human machine interface (HMI), and output the information to an HMI or an executor. For example, the ECU loads a program stored in a read-only memory (ROM) to a random-access memory (RAM), and runs a program in the RAM, to implement an autonomous driving function. The ECU may recognize a static and/or dynamic target around the vehicle, for example, monitor a speed or a direction of a surrounding target based on an external sensor. The ECU can obtain the status information of the vehicle based on output information of the internal sensor. The ECU plans a driving route based on the information, and outputs a corresponding control signal to the executor, and the executor performs a corresponding operation.

In this embodiment of this application, a communication unit is configured to exchange data with a surrounding vehicle, a roadside communication device, or a server. For example, a radio coupled to an antenna may be located in a vehicle to provide wireless communication for a system. The communication unit may operate based on any wireless communication technology or wireless standard, including but not limited to one or more of vehicle-to-everything (V2X), Wi-Fi (IEEE 802.11), Global System for Mobile Communications (GSM), code-division multiple access (CDMA), time-division multiple access (TDMA), Long-Term Evolution (LTE), and new radio (NR).

In this embodiment of this application, the map database is configured to store map information. In some feasible embodiments, a hard disk drive (HDD) may be used as a data storage device of the map database. The map database may be stored in a single map server, or may be stored in a map server implemented based on a cloud storage technology.

The execution subsystem 403 may include at least an executor, and the executor is configured to control the vehicle 400 to perform lateral and/or longitudinal motion. For example, a brake actuator controls a braking system and braking force based on a control signal received from the ECU; and a steering actuator controls a steering system based on a control signal from the ECU. In some feasible embodiments, the steering system may be an electronic steering system or a mechanical steering system.

It should be noted that elements of the system in FIG. 4 are for illustrative purposes only, and other systems including more or fewer components may be configured to perform any method disclosed in this application.

Figure 5:
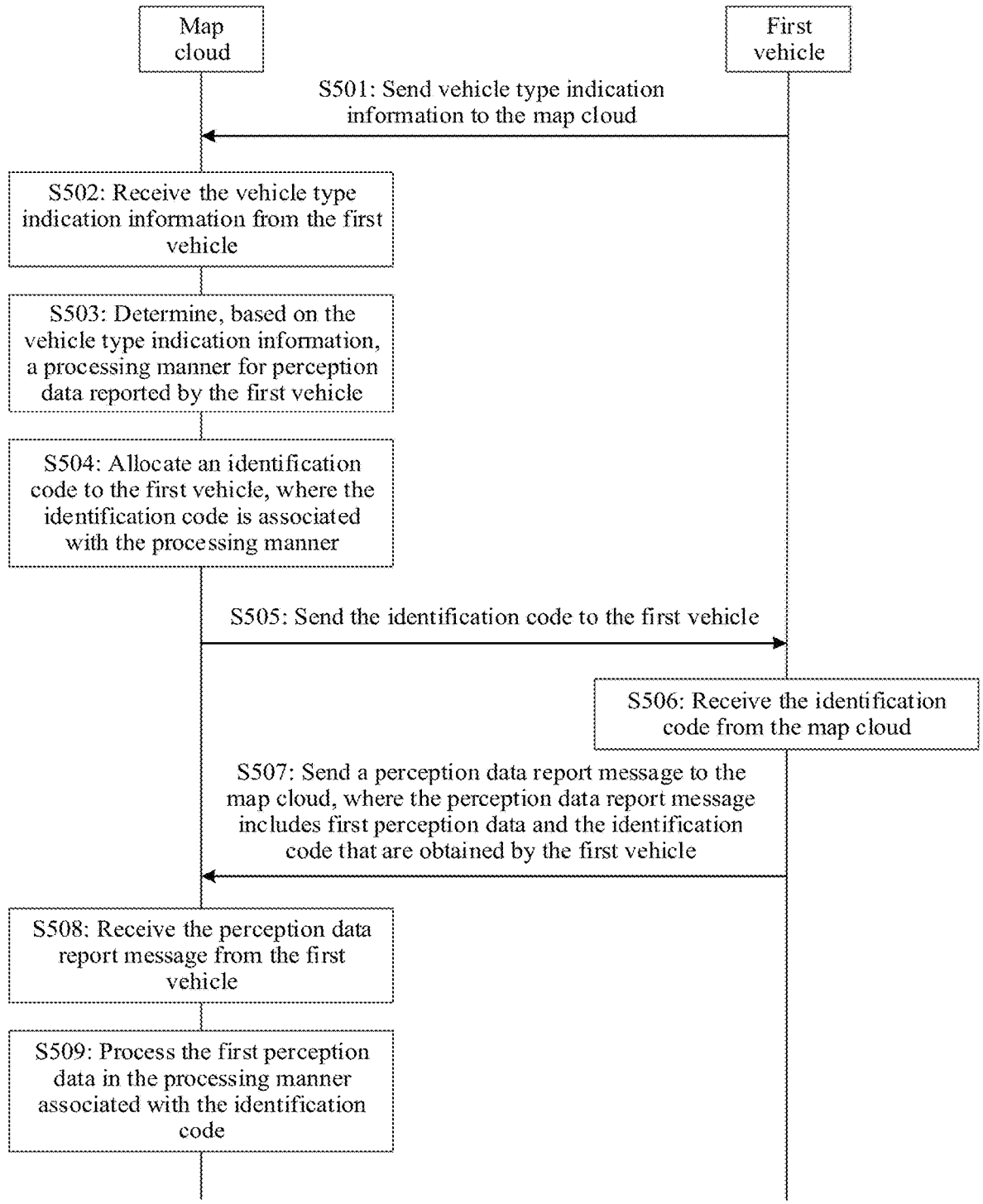
FIG. 5 is a schematic flowchart of a data processing method according to an embodiment of this application.

Refer to FIG. 5. FIG. 5 is a schematic flowchart of a data processing method according to an embodiment of this application, and specifically describes how the map cloud processes the perception data reported by the vehicle in the application scenario (in which the vehicle directly communicates with the map cloud) shown in FIG. 2. The method may include but is not limited to the following steps.

Step S501: A first vehicle sends vehicle type indication information to a map cloud.

In this embodiment of this application, the vehicle type indication information may include at least one of the following content: attribute information of the first vehicle; holder information of the first vehicle; a model or a configuration parameter of a data collection apparatus in the first vehicle; a model or a configuration parameter of a data processing apparatus in the first vehicle; or a data type supported by the first vehicle for reporting.

In this embodiment of this application, for example, the attribute information may be information that can indicate whether the first vehicle is a registered crowdsourcing data collection vehicle or a vehicle that is not registered with a map service provider. For another example, the attribute information may be information that can indicate whether the first vehicle is a vehicle managed by a travel company or a map service provider in a unified manner or a social idle vehicle.

For example, the holder information of the vehicle may include ownership information of a natural person of the vehicle, ownership information of a legal person of the vehicle, or the like.

For example, the model or configuration parameter of the data collection apparatus in the vehicle may be a model or a configuration parameter of a sensor.

For example, the model or configuration parameter of the data processing apparatus in the vehicle may be a model or a configuration parameter of a processor.

For example, the data type supported by the first vehicle for reporting may be at least one of a plurality of data types supported by an industry standard. For example, a data type supported by a vehicle for uploading may be a character type. For another example, a data type supported by a vehicle for uploading may be an integer type. For another example, a vehicle configures a data packet based on a specification of a specific standard.

Step S502: The map cloud receives the vehicle type indication information from the first vehicle.

Step S503: The map cloud determines, based on the vehicle type indication information, a processing manner for perception data reported by the first vehicle.

In this embodiment of this application, the foregoing processing manner may include: setting a confidence level of first perception data to a first confidence level, where the first confidence level is associated with an identification code; or determining that a usage priority of the first perception data is a first priority, where the first priority is associated with an identification code. It should be noted that the first confidence level and the first priority are only examples, and should not constitute a limitation. In this implementation, manners of processing the first perception data are enriched, so that the first perception data can be processed in a targeted manner subsequently.

Step S504: The map cloud allocates an identification code to the first vehicle, where the identification code is associated with the processing manner.

In some embodiments, the identification code may be used to uniquely identify the first vehicle. That the identification code is associated with the processing manner may be represented as that there is a correspondence between the identification code and the processing manner. During actual application, the correspondence between the identification code and the processing manner may be established, and the correspondence between the identification code and the processing manner is stored. For example, the correspondence between the identification code and the processing manner may be shown in Table 1.

TABLE 1

| Identification code | Processing manner |
|---|---|
| ID 1 | Processing manner 1 |
| ID 2 | Processing manner 2 |
| ID 3 | Processing manner 3 |

A person skilled in the art may learn that Table 1 is only a possible representation form of the correspondence, and a quantity and types of parameters in the table and specific values of the parameters may be adaptively modified. This is not specifically limited in this application.

In some embodiments, the processing manner is a first type of processing manner in a plurality of types of processing manners, and that the identification code is associated with the processing manner may be represented as indicating the first type of processing manner by using the identification code.

Step S505: The map cloud sends the identification code to the first vehicle.

Step S506: The first vehicle receives the identification code from the map cloud.

Step S507: The first vehicle sends a perception data report message to the map cloud, where the perception data report message includes the first perception data reported by the first vehicle and the identification code.

In this embodiment of this application, the perception data is data obtained by a vehicle by using a sensor and reported by the vehicle to the map cloud.

Step S508: The map cloud receives the perception data report message from the first vehicle.

Step S509: The map cloud processes the first perception data in the processing manner associated with the identification code.

For example, the identification code indicates the processing manner 1, and in this case, the first perception data is processed in the processing manner 1. For another example, the identification code indicates the processing manner 2, and in this case, the first perception data is processed in the processing manner 2.

In this embodiment of this application, in the application scenario in which the vehicle directly communicates with the map cloud, the map cloud separately processes vehicles from different sources, and allocates corresponding identification codes to the vehicles. Because a perception data report message sent by the vehicle includes perception data and the identification code that are obtained by the vehicle, security and reliability of the map cloud when using the perception data can be improved.

It should be noted that, in the application scenario shown in FIG. 2, the map cloud may implement key configuration and management. For the first vehicle, the first vehicle may encrypt, based on a key from the map cloud, data obtained by the sensor, to obtain the first perception data. Then, the first vehicle sends the perception data report message to the map cloud. In this case, the perception data report message includes the encrypted first perception data obtained by the first vehicle through key encryption and the identification code, so that the map cloud can decrypt the first perception data based on the key, and processes the decrypted first perception data in the processing manner associated with the identification code. It should be understood that the key in this specification may be a private key, or may be a symmetric key encrypted by using a public key, or a digital authentication certificate. This implementation can improve security of information exchange between interaction ends.

In an application scenario in which the map cloud directly exchanges information with the vehicle, the following specifically describes how the map cloud processes perception data reported by the vehicle when the vehicle is a registered crowdsourcing data collection vehicle. The following may include but is not limited to the following steps.

Step S1-1: The first vehicle sends the vehicle type indication information to the map cloud.

During specific implementation, the vehicle type indication information may include at least one piece of the following information: a model of a crowdsourcing data collection unit; a model of a crowdsourcing data processing unit; a capability of the crowdsourcing data collection unit; a capability of the crowdsourcing data processing unit; an identifier of a company to which the first vehicle belongs; identity information of an individual to which the first vehicle belongs; an identifier of a manufacturer of the first vehicle; or a value generated between a cloud and the company according to a predefined rule. For example, a value generated between the cloud and the company according to the predefined rule may be 1, or may be any other value. This is only an example.

Step S1-2: The map cloud receives the vehicle type indication information from the first vehicle.

Step S1-3: The map cloud determines, based on the vehicle type indication information, the processing manner for the perception data reported by the first vehicle.

During specific implementation, the foregoing processing manner may include: setting the confidence level of the first perception data as the first confidence level, where the first confidence level is associated with the identification code allocated by the map cloud to the vehicle; and further, corresponding to that the vehicle is a registered crowdsourcing data collection vehicle, the first confidence level is higher than a confidence level of perception data reported by an unregistered data collection vehicle; and determining that the usage priority of the first perception data is the first priority, where the first priority is associated with the identification code; and further, corresponding to that the vehicle is a registered crowdsourcing data collection vehicle, the first priority is higher than a priority of the perception data reported by the unregistered data collection vehicle. In this implementation, because the first perception data has the foregoing features, when a high-precision map is updated by using the first perception data, accuracy of the high-precision map can be improved.

Step S1-4: The map cloud allocates the identification code to the first vehicle, where the identification code is associated with the processing manner.

Step S1-5: The map cloud sends the identification code to the first vehicle.

Step S1-6: The first vehicle receives the identification code from the map cloud.

Step S1-7: The first vehicle sends the perception data report message to the map cloud, where the perception data report message includes the first perception data reported by the first vehicle and the identification code.

Step S1-8: The map cloud receives the perception data report message from the first vehicle.

Step S1-9: The map cloud processes the first perception data in the processing manner associated with the identification code.

It may be understood that, in the application scenario shown in FIG. 3, for a vehicle that is a registered crowdsourcing data collection vehicle, interaction peers in the foregoing method are a vehicle side and a map cloud. The vehicle side includes the vehicle and the vehicle cloud. In this case, the vehicle indirectly communicates with the map cloud by using the vehicle cloud. For specific implementation, refer to related descriptions in the foregoing embodiments. Details are not described herein again.

Figure 6A:
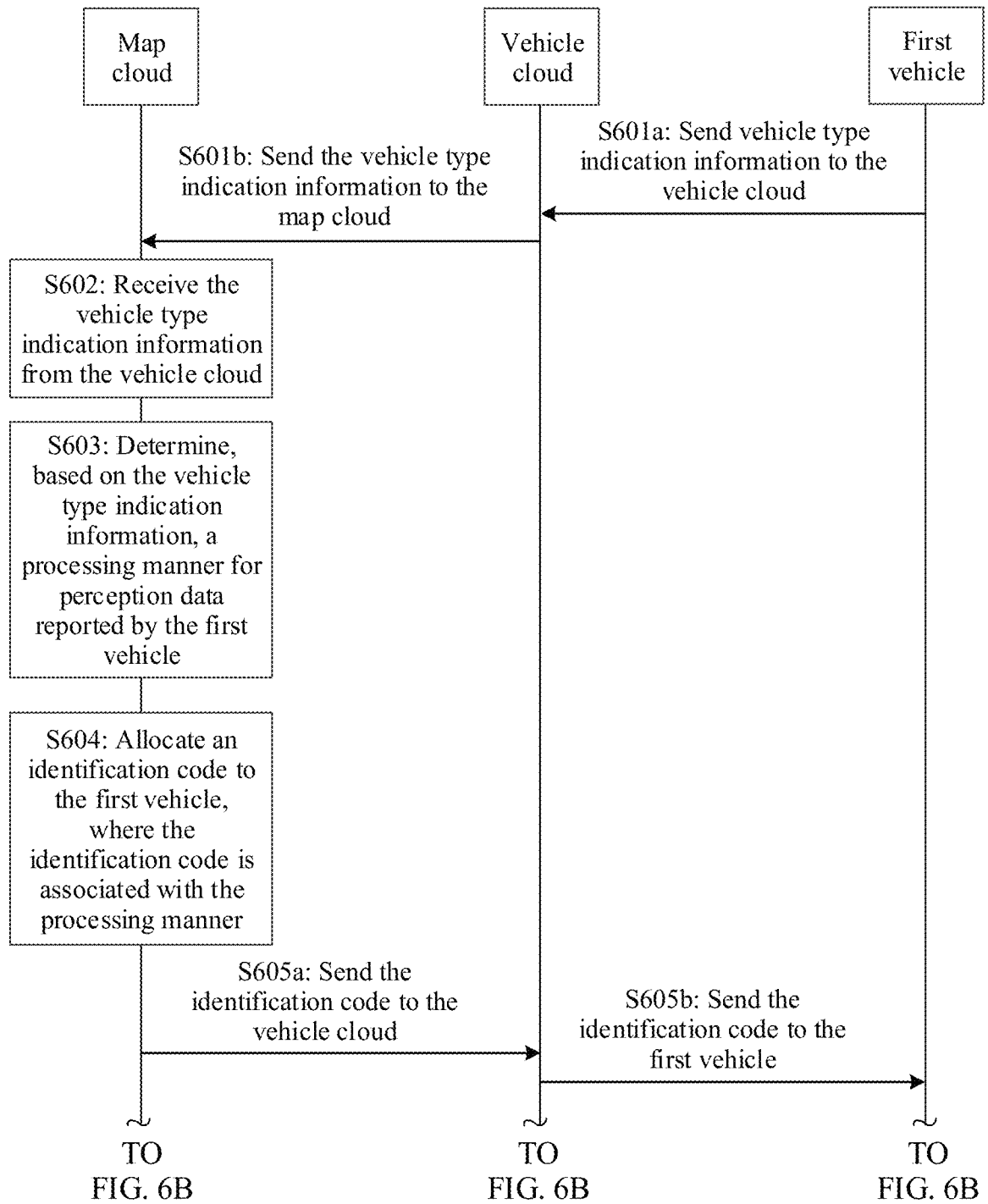
FIG. 6A and FIG. 6B are a schematic flowchart of another data processing method according to an embodiment of this application.
Figure 6B:
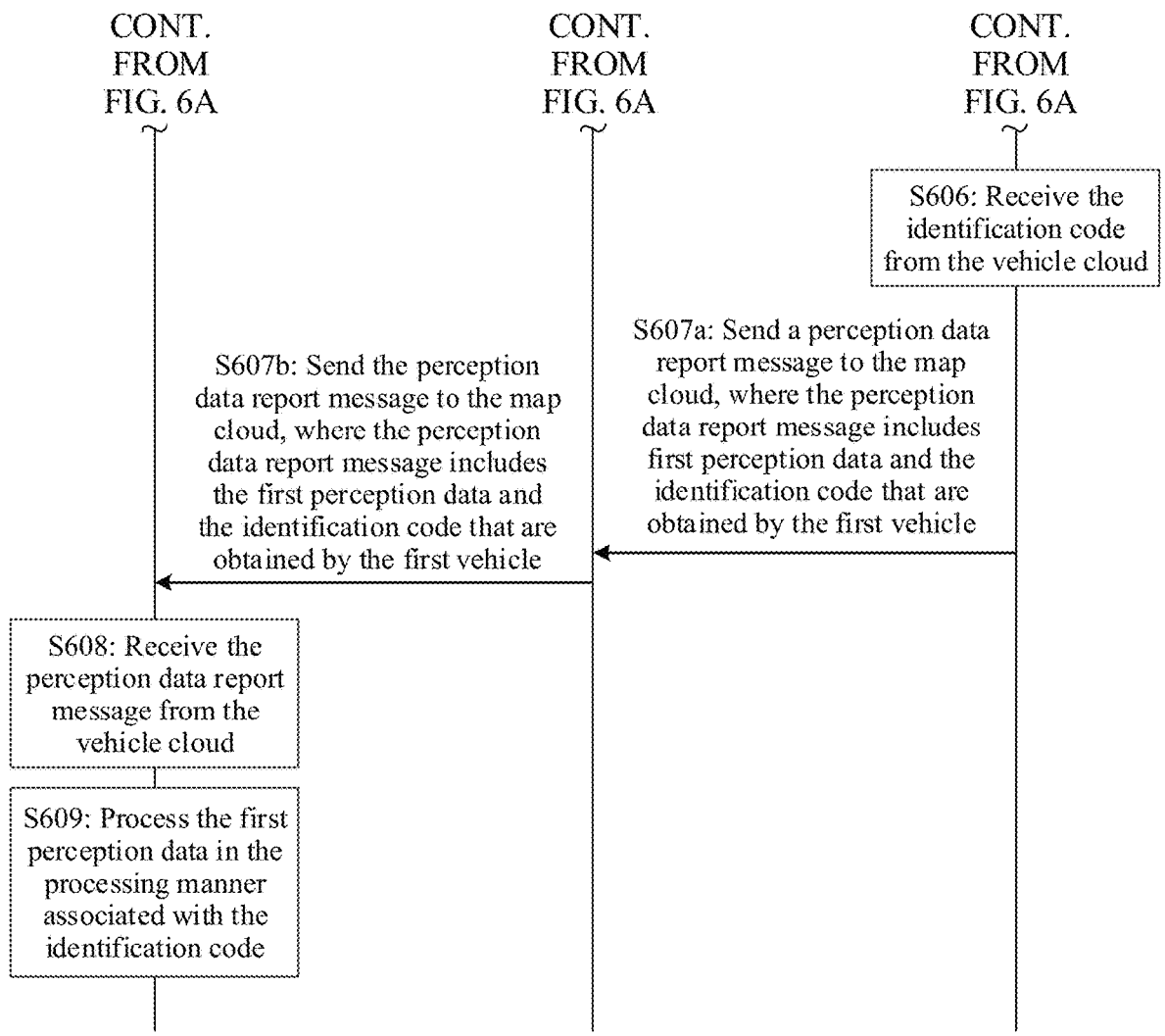

Refer to FIG. 6A and FIG. 6B. FIG. 6A and FIG. 6B are a schematic flowchart of a data processing method according to an embodiment of this application, and specifically describes how the map cloud processes the perception data reported by the vehicle in the application scenario (in which the vehicle indirectly communicates with the map cloud by using the vehicle cloud) shown in FIG. 3. The method may include but is not limited to the following steps.

Step S601*a*: A first vehicle sends vehicle type indication information to a vehicle cloud.

Step S601*b*: The vehicle cloud sends the vehicle type indication information to a map cloud.

For a specific representation form of the vehicle type indication information, refer to the foregoing descriptions. Details are not described herein again.

Step S602: The map cloud receives the vehicle type indication information from the vehicle cloud.

Step S603: The map cloud determines, based on the vehicle type indication information, a processing manner for perception data reported by the first vehicle.

Step S604: The map cloud allocates an identification code to the first vehicle, where the identification code is associated with the processing manner.

Step S605*a*: The map cloud sends the identification code to the vehicle cloud.

Step S605*b*: The vehicle cloud sends the identification code to the first vehicle.

Step S606: The first vehicle receives the identification code from the vehicle cloud.

Step S607*a*: The first vehicle sends a perception data report message to the vehicle cloud, where the perception data report message includes first perception data reported by the first vehicle and the identification code.

Step S607*b*: The vehicle cloud sends the perception data report message to the map cloud.

Step S608: The map cloud receives the perception data report message from the vehicle cloud.

Step S609: The map cloud processes the first perception data in the processing manner associated with the identification code.

In this embodiment of this application, in the application scenario in which the vehicle indirectly communicates with the map cloud by using the vehicle cloud, the map cloud separately processes vehicles from different sources, and allocates corresponding identification codes to the vehicles. Because a perception data report message sent by the vehicle includes perception data and the identification code that are obtained by the vehicle, security and reliability of the map cloud when using the perception data can be improved.

It should be noted that in the application scenario shown in FIG. 3, the vehicle cloud may implement key configuration and management, and the vehicle cloud establishes a communication connection to the map cloud through handshaking. For example, the vehicle cloud and the map cloud implement handshaking according to a key rule. For the first vehicle, the first vehicle may encrypt, based on a key from the vehicle cloud, data obtained by a sensor, to obtain the first perception data. Then, the first vehicle sends the perception data report message to the vehicle cloud. In this case, the perception data report message includes the encrypted first perception data obtained by the first vehicle through key encryption and the identification code. The vehicle cloud forwards the perception data report message to the map cloud. Because the vehicle cloud establishes the communication connection to the map cloud through handshaking, the vehicle cloud may assist the map cloud in decrypting the first perception data. It should be understood that the key in this embodiment may be a private key, or may be a symmetric key encrypted by using a public key, or a digital authentication certificate. This implementation can improve security of information exchange between interaction ends.

Figure 7:
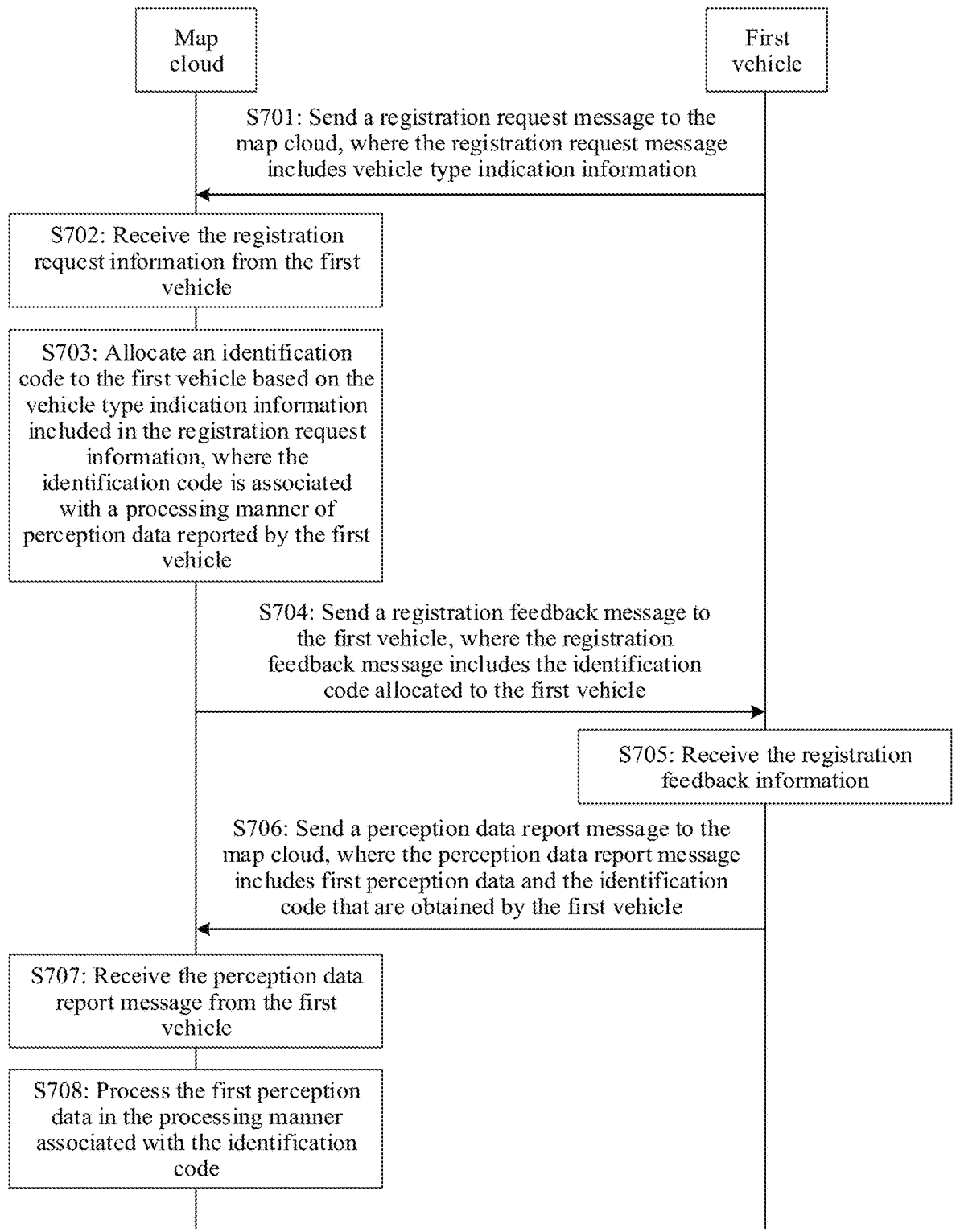
FIG. 7 is a schematic flowchart of another data processing method according to an embodiment of this application.

Refer to FIG. 7. FIG. 7 is a schematic flowchart of a data processing method according to an embodiment of this application, and specifically describes how the map cloud processes the perception data reported by the vehicle when the vehicle is an unregistered crowdsourcing data collection vehicle in the application scenario (in which the map cloud directly performs information exchange with the vehicle) shown in FIG. 2. The method may include but is not limited to the following steps.

Step S701: A first vehicle sends a registration request message to a map cloud, where the registration request message includes vehicle type indication information.

Step S702: The map cloud receives the registration request message from the first vehicle.

S703: The map cloud allocates an identification code to the first vehicle based on the vehicle type indication information included in the registration request message, where the identification code is associated with a processing manner of perception data reported by the first vehicle.

In some embodiments, the identification code allocated by the map cloud to the first vehicle indicates that the first vehicle is a successfully registered crowdsourcing data collection vehicle.

S704: The map cloud sends a registration feedback message to the first vehicle, where the registration feedback message includes the identification code allocated to the first vehicle.

Step S705: The first vehicle receives the registration feedback information from the map cloud.

Step S706: The first vehicle sends the perception data report message to the map cloud, where the perception data report message includes the first perception data reported by the first vehicle and the identification code.

Step S707: The map cloud receives the perception data report message from the first vehicle.

Step S708: The map cloud processes the first perception data in the processing manner associated with the identification code.

It may be understood that, in the application scenario shown in FIG. 3, for a vehicle that is an unregistered crowdsourcing data collection vehicle, interaction peers in the foregoing method are a vehicle side and a map cloud. The vehicle side includes the vehicle and the vehicle cloud. In this case, the vehicle indirectly communicates with the map cloud by using the vehicle cloud. For specific implementation, refer to related descriptions in the foregoing embodiments. Details are not described herein again.

Figure 8A:
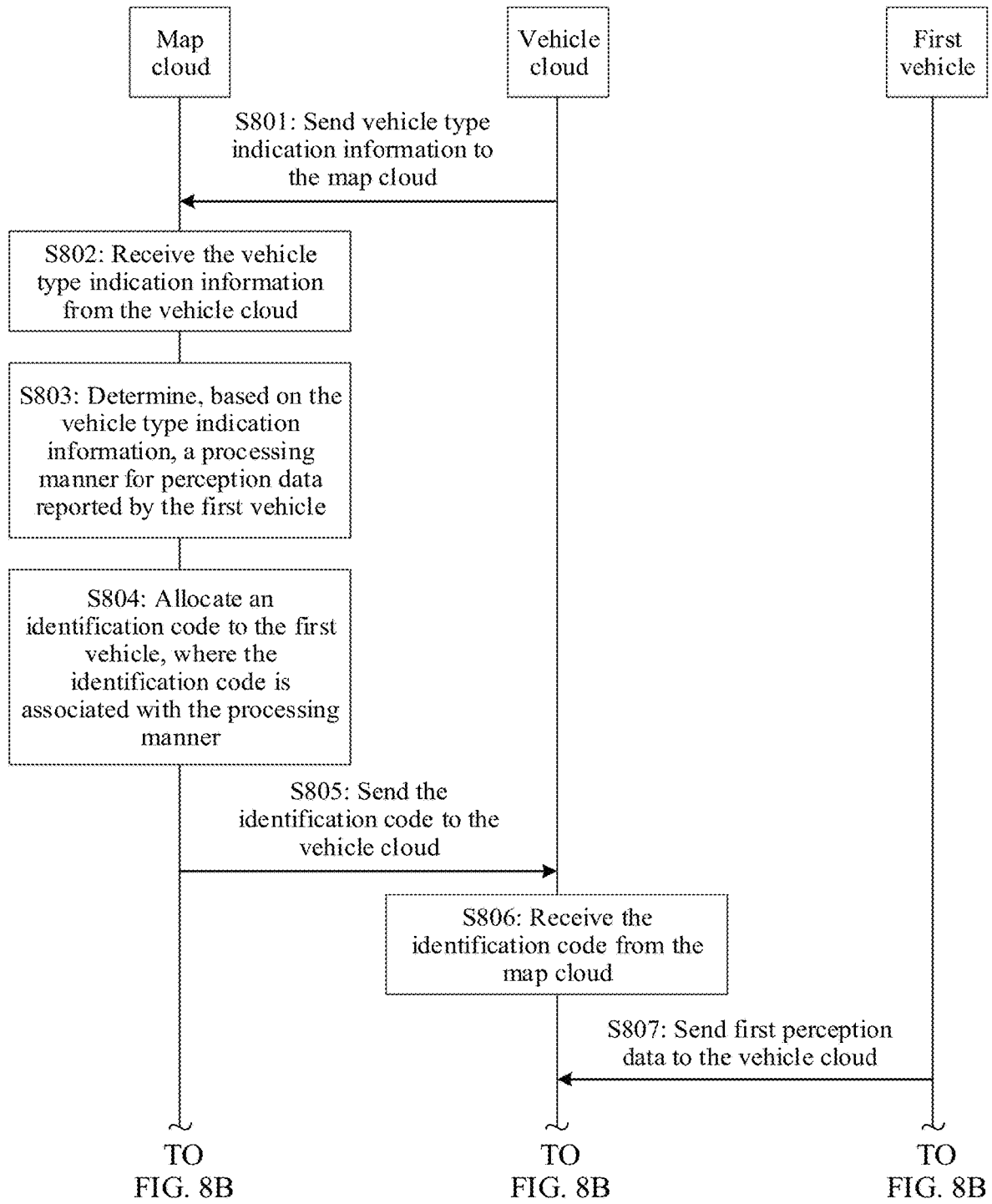
FIG. 8A and FIG. 8B are a schematic flowchart of another data processing method according to an embodiment of this application.
Figure 8B:
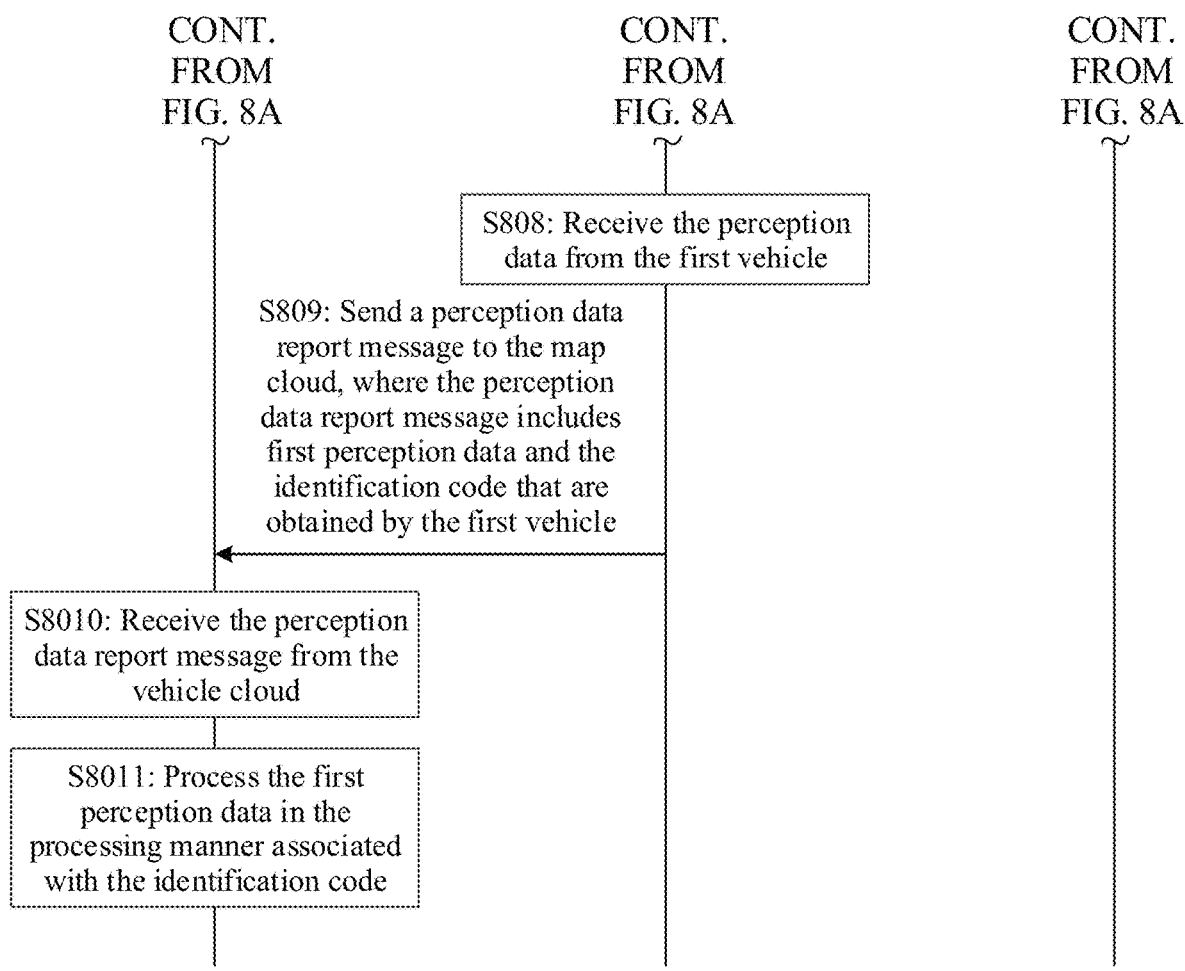

It should be noted that, in the method embodiment shown in FIG. 6A and FIG. 6B, it is described that the vehicle cloud is used as an intermediate transmission medium to implement information transmission between the vehicle and the map cloud. This implementation is only an example, and should not constitute a limitation. In some embodiments, after the vehicle cloud obtains the vehicle type indication information sent by the first vehicle, the vehicle cloud processes the obtained vehicle type indication information. For example, the processing may include: adding label information to the vehicle type indication information, encapsulating the vehicle type indication information and the label information, and sending the encapsulated vehicle type indication information and label information to the map cloud, so that the map cloud performs another processing step shown in FIG. 6A and FIG. 6B. In some embodiments, the vehicle type indication information may be generated by the vehicle cloud based on information interaction between the first vehicle and the vehicle cloud. In this case, the vehicle cloud may send the vehicle type indication information to the map cloud, so that the map cloud determines, based on the vehicle type indication information, the processing manner for the perception data reported by the first vehicle. In some embodiments, when the map cloud sends the identification code to the vehicle cloud, the vehicle cloud may store the identification code, and does not forward the identification code to the first vehicle. When the first vehicle reports the obtained first perception data to the vehicle cloud, the vehicle cloud may encapsulate the first perception data reported by the first vehicle and the identification code of the first vehicle that is stored in the vehicle cloud into the perception data report message, and then send the encapsulated perception data report message to the map cloud, so that the map cloud performs a subsequent processing step. The following provides specific descriptions with reference to one of the foregoing examples. FIG. 8A and FIG. 8B are a schematic flowchart of a data processing method according to an embodiment of this application, and specifically describes how the map cloud processes the perception data reported by the vehicle in the application scenario (in which the vehicle indirectly communicates with the map cloud by using the vehicle cloud) shown in FIG. 3. The method may include but is not limited to the following steps.

Step S801: A vehicle cloud sends vehicle type indication information to a map cloud.

In some embodiments, the vehicle type indication information may be generated by the vehicle cloud, because the vehicle cloud, as a vehicle manager, stores some basic information of a vehicle, and may indicate a type, an identity, or a capability of the vehicle.

Step S802: The map cloud receives the vehicle type indication information from the vehicle cloud.

Step S803: The map cloud determines, based on the vehicle type indication information, a processing manner for perception data reported by a first vehicle.

Step S804: The map cloud allocates an identification code to the first vehicle, where the identification code is associated with the processing manner.

Step S805: The map cloud sends the identification code to the vehicle cloud.

Step S806: The vehicle cloud receives the identification code from the map cloud. During specific implementation, after receiving the identification code sent by the map cloud, the vehicle cloud may store only the identification code, and does not send the identification code to the vehicle.

Step S807: The first vehicle sends first perception data to the vehicle cloud.

Step S808: The vehicle cloud receives the first perception data from the first vehicle.

Step S809: The vehicle cloud sends a perception data report message to the map cloud, where the perception data report message includes the perception data reported by the first vehicle and the identification code.

During specific implementation, after obtaining the first perception data reported by the first vehicle, the vehicle cloud may encapsulate the first perception data reported by the first vehicle and the identification code of the first vehicle that is stored in the vehicle cloud into the perception data report message, and then send the encapsulated perception data report message to the map cloud.

Step S8010: The map cloud receives the perception data report message from the vehicle cloud.

Step S8011: The map cloud processes the first perception data in the processing manner associated with the identification code.

It should be noted that, in the method embodiment shown in FIG. 7, how the vehicle cloud performs information exchange with the map cloud is described, to implement processing of the perception data reported by the first vehicle. Compared with the method embodiment shown in FIG. 6A and FIG. 6B, the vehicle cloud no longer merely serves as an intermediate transmission medium, but substantially participates in perception data processing.

It should be noted that, in the method embodiments shown in FIG. 5 to FIG. 8B, the perception data may be lane-level data reported by a vehicle. For the map cloud, after obtaining the perception data reported by a plurality of vehicles, the map cloud may update a high-precision map based on the perception data reported by the plurality of vehicles, to obtain a lane-level high-precision map in an accurate and timely manner. Further, the plurality of vehicles may be vehicles traveling in a specific area. For the map cloud, a local area may be updated in a targeted manner. This improves an update speed of the high-precision map, and further reduces costs of collecting update information.

During actual application, after the map cloud updates the high-precision map, the map cloud may send the updated high-precision map to the first vehicle. In a feasible embodiment, the application scenario shown in FIG. 3 is used as an example. Before sending the updated high-precision map to the first vehicle, the map cloud determines a map format acceptable to the first vehicle. If the updated high-precision map on the map cloud is in a file format acceptable to the first vehicle, the map cloud directly sends the updated high-precision map to the first vehicle. If the updated high-precision map of the map cloud is not in a file format acceptable to the first vehicle, the map cloud needs to convert the updated high-precision map into a map format acceptable to the first vehicle, so that the first vehicle can perform autonomous driving based on the updated high-precision map, or the driver can drive based on the updated high-precision map.

In addition, the first vehicle may alternatively actively request a map update. After receiving a map update request sent by the first vehicle, the map cloud sends updated high-precision map data to the first vehicle, and the first vehicle may determine, based on the map data, whether the map update needs to be performed.

Alternatively, the map cloud may directly send an updated version of the high-precision map update file to the first vehicle. For the first vehicle, if the first vehicle determines that a high-precision map stored in the first vehicle is a latest version, the first vehicle does not need to update the high-precision map. If the first vehicle determines that the high-precision map stored in the first vehicle is not a latest version, the first vehicle may perform a map update based on the map update file.

For example, an existing high-precision map version of the first vehicle is a version 1.0, and a map update file generated by the map cloud after an update is a version 1.1. The map cloud first sends the map update file of the version 1.1 to the first vehicle, the first vehicle compares the version number 1.1 with a high-precision map version number stored in the first vehicle, and determines that the high-precision map version stored in the first vehicle is not a latest version. In this case, the first vehicle may perform a map update the map based on the map update file. Then, the first vehicle may perform autonomous driving based on the updated high-precision map, or the driver may drive based on the updated high-precision map.

The foregoing embodiment focuses on how the map cloud processes the perception data reported by the vehicle. The following specifically describes an apparatus in this application. It should be noted that, for details not disclosed in apparatus embodiments of this application, refer to the method embodiments of this application. It may be understood that, to implement the foregoing functions, each apparatus includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is implemented by hardware or hardware driven by computer software depends on a particular application and a design constraint condition of the technical solutions. A person skilled in the art may use different methods to implement the described functions for each particular application, but it should not be considered that the implementation goes beyond the scope of this application.

In embodiments of this application, the device may be divided into function modules based on the foregoing method examples. For example, each function module may be obtained through division based on each corresponding function, or two or more functions may be integrated into one module. The integrated module may be implemented in a form of hardware, or may be implemented in a form of a software function module. It should be noted that, in embodiments of this application, division into modules is an example, and is merely a logical function division. In actual implementation, another division manner may be used.

Figure 9:
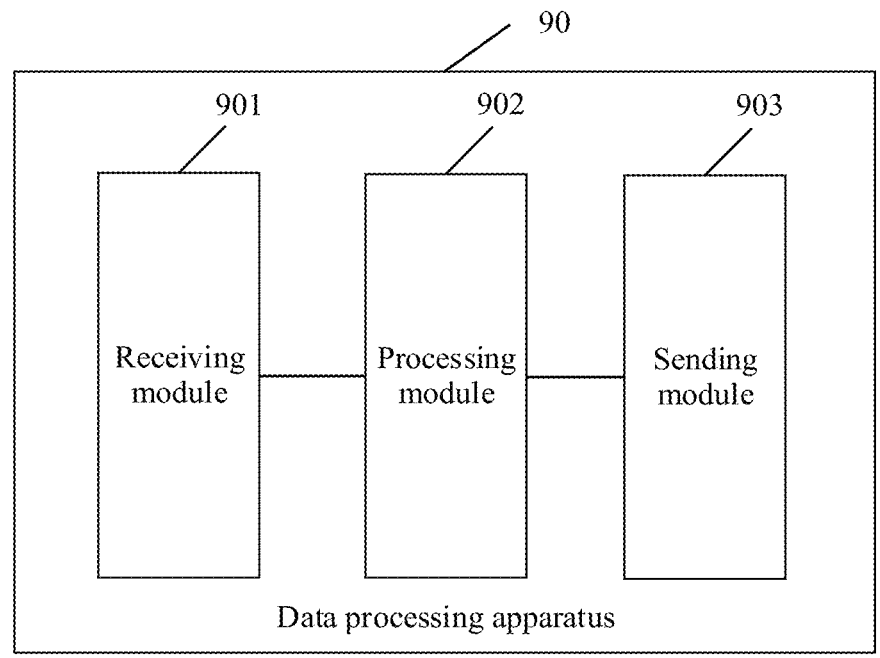
FIG. 9 is a schematic diagram of a structure a data processing apparatus according to an embodiment of this application.

When each function module is obtained through division based on each corresponding function, FIG. 9 is a schematic diagram of a possible logical structure of an apparatus. The apparatus may be the foregoing data processing apparatus, or may be a chip in the data processing apparatus, or may be a processing system in the data processing apparatus, or the like.

As shown in FIG. 9, an embodiment of this application provides a data processing apparatus. The data processing apparatus 90 may include a receiving module 901, a processing module 902, and a sending module 903.

The receiving module 901 is configured to receive vehicle type indication information from a vehicle side, where the vehicle type indication information indicates a type of a first vehicle.

The processing module 902 is configured to: determine, based on the vehicle type indication information, a processing manner for perception data reported by the first vehicle; and allocate an identification code to the first vehicle, where the identification code is associated with the processing manner.

The sending module 903 is configured to send the identification code to the vehicle side.

The receiving module 901 is further configured to receive a perception data report message from the vehicle side, where the perception data report message includes first perception data reported by the first vehicle and the identification code.

The processing module 902 is further configured to process the first perception data in the processing manner associated with the identification code.

In a possible implementation, the foregoing processing manner includes: setting a confidence level of the first perception data to a first confidence level, where the first confidence level is associated with the identification code; or determining that a usage priority of the first perception data is a first priority, where the first priority is associated with the identification code.

In a possible implementation, the identification code uniquely identifies the first vehicle, and that the identification code is associated with the processing manner includes: storing an association relationship between the identification code and the processing manner.

In a possible implementation, the processing manner is a first type of processing manner in a plurality of types of processing manners, and that the identification code is associated with the processing manner includes:

The identification code indicates the first type of processing manner.

In a possible implementation, the vehicle type indication information includes at least one of the following content:
  attribute information of the first vehicle;
  holder information of the first vehicle;
  a model or a configuration parameter of a data collection apparatus in the first vehicle;
  a model or a configuration parameter of a data processing apparatus in the first vehicle; or
  a data type supported by the first vehicle for reporting.

In a possible implementation, when the first vehicle is a registered crowdsourcing data collection vehicle, the vehicle type indication information includes at least one piece of the following information:
  a model of a crowdsourcing data collection unit;
  a model of a crowdsourcing data processing unit;
  a capability of the crowdsourcing data collection unit;
  a capability of the crowdsourcing data processing unit;
  an identifier of a company to which the first vehicle belongs;
  identity information of an individual to which the first vehicle belongs;
  an identifier of a manufacturer of the first vehicle; or
  a value generated between a cloud and the company according to a predefined rule.

In a possible implementation, when the first vehicle is a registered crowdsourcing data collection vehicle, the first confidence level is higher than a confidence level of perception data reported by an unregistered data collection vehicle, and the first priority is higher than a priority of the perception data reported by the unregistered data collection vehicle.

In a possible implementation, when the first vehicle is an unregistered data collection vehicle, the receiving module 901 is specifically configured to receive a registration request message from the vehicle side, where the registration request message includes the vehicle type indication information.

It should be noted that for implementation of each unit, refer to corresponding descriptions in the embodiments shown in FIG. 5 to FIG. 8B.

Figure 10:
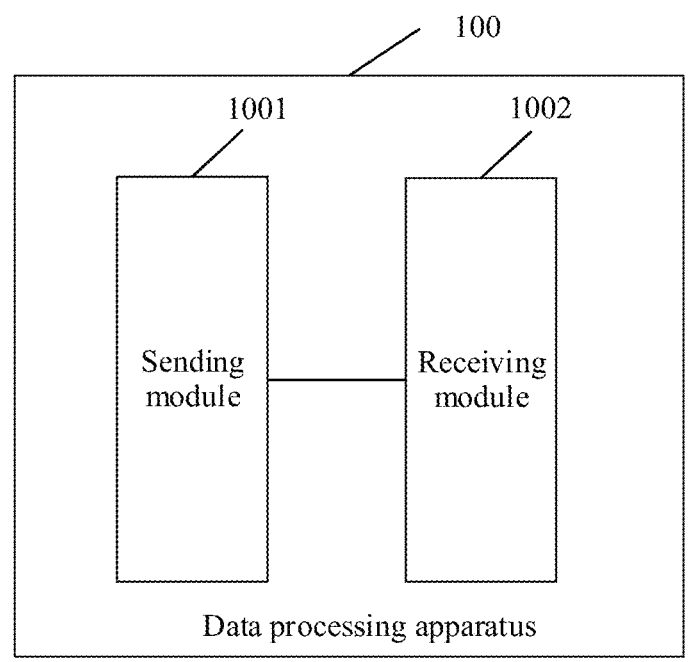
FIG. 10 is a schematic diagram of a structure of another data processing apparatus according to an embodiment of this application.

In this embodiment of this application, FIG. 10 is a schematic diagram of a possible logical structure of an apparatus. The apparatus may be the foregoing data processing apparatus, or may be a chip in the data processing apparatus, or may be a processing system in the data processing apparatus, or the like. As shown in FIG. 10, an embodiment of this application provides a data processing apparatus. The data processing apparatus 100 may include a sending module 1001 and a receiving module 1002.

The sending module 1001 is configured to send vehicle type indication information to a server side.

The receiving module 1002 receives an identification code from the server side, where the identification code is associated with a processing manner for perception data reported by a first vehicle.

The sending module 1001 is further configured to send a perception data report message to the server side, where the perception data report message includes first perception data reported by the first vehicle and the identification code.

In a possible implementation, the foregoing processing manner includes: setting a confidence level of the first perception data to a first confidence level, where the first confidence level is associated with the identification code; or determining that a usage priority of the first perception data is a first priority, where the first priority is associated with the identification code.

In a possible implementation, the identification code uniquely identifies the first vehicle.

In a possible implementation, the processing manner is a first type of processing manner in a plurality of types of processing manners, and that the identification code is associated with a processing manner for perception data reported by a first vehicle includes:

The identification code indicates the first type of processing manner.

In a possible implementation, the vehicle type indication information includes at least one of the following content:
 attribute information of the first vehicle;
 holder information of the first vehicle;
 a model or a configuration parameter of a data collection apparatus in the first vehicle;
 a model or a configuration parameter of a data processing apparatus in the first vehicle; or
 a data type supported by the first vehicle for reporting.

In a possible implementation, the vehicle type indication information includes at least one piece of the following information:
 a model of a crowdsourcing data collection unit;
 a model of a crowdsourcing data processing unit;
 a capability of the crowdsourcing data collection unit;
 a capability of the crowdsourcing data processing unit;
 an identifier of a company to which the first vehicle belongs;
 identity information of an individual to which the first vehicle belongs;
 an identifier of a manufacturer of the first vehicle; or
 a value generated between a cloud and the company according to a predefined rule.

In a possible implementation, when the first vehicle is a registered crowdsourcing data collection vehicle, the first confidence level is higher than a confidence level of perception data reported by an unregistered data collection vehicle, and the first priority is higher than a priority of the perception data reported by the unregistered data collection vehicle.

In a possible implementation, when the first vehicle is an unregistered data collection vehicle, and the sending module 1001 is specifically configured to send a registration request message to the server side, where the registration request message includes the vehicle type indication information.

It should be noted that for implementation of each unit, refer to corresponding descriptions in the embodiments shown in FIG. 5 to FIG. 8B.

Figure 11:
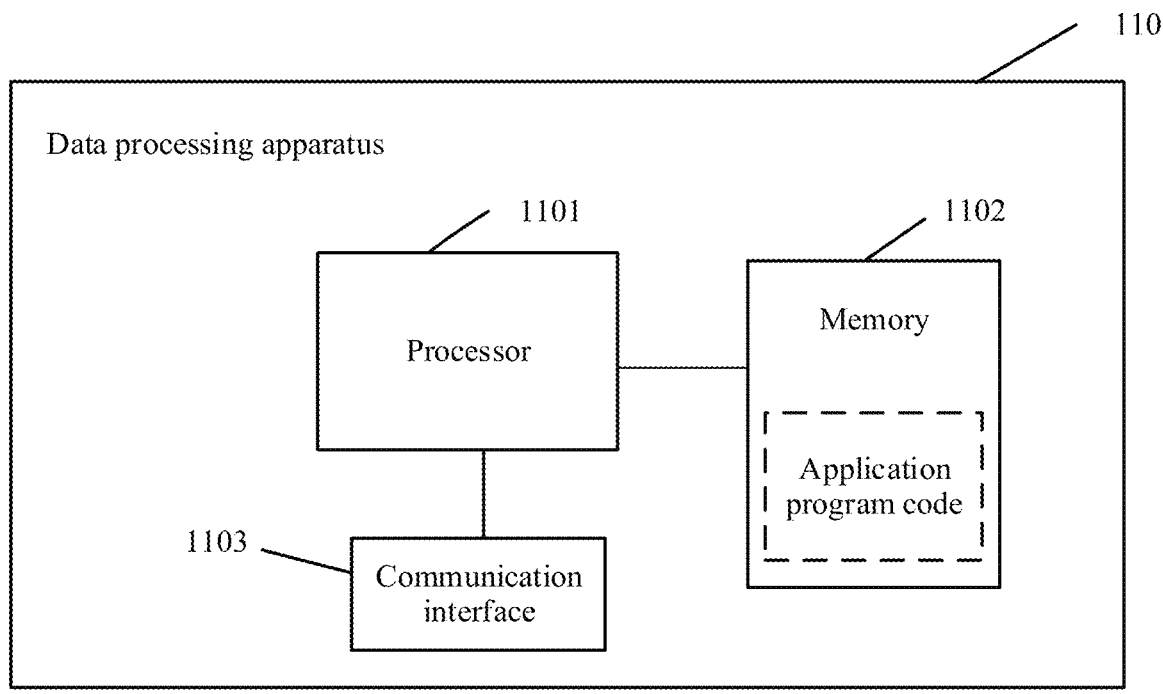
FIG. 11 is a schematic diagram of a structure of another data processing apparatus according to an embodiment of this application.

FIG. 11 is a schematic diagram of a structure a data processing apparatus 110 according to an embodiment of this application. The data processing apparatus 110 includes at least one processor 1101 and at least one communication interface 1103. Optionally, the data processing apparatus 110 may further include at least one memory 1102. A cloud server may further include a general-purpose component such as an antenna. Details are not described herein. During actual application, based on solution 1 in scenario 1 and solution 2 in scenario 2 described in this application, the data processing apparatus 110 may be a singly deployed map server, or may be a plurality of distributedly deployed map servers, or may be a component or a chip in a map server.

The processor 1101 may be a general-purpose central processing unit (CPU), a microprocessor, an application-specific integrated circuit (ASIC), or one or more integrated circuits configured to control program execution of the foregoing solution.

The communication interface 1103 is configured to communicate with another device or a communication network.

The memory 1102 may be a ROM or another type of static storage device capable of storing static information and instructions, a RAM or another type of dynamic storage device capable of storing information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray optical disc, or the like), a magnetic disk storage medium, or another magnetic storage device, or any other medium that can carry or store expected program code in a form of an instruction or a data structure and can be accessed by a computer, but is not limited thereto. The memory may exist independently, and is connected to the processor through a bus. The memory may alternatively be integrated with the processor.

The memory 1102 is configured to store application code for executing the foregoing solution, and the processor 1101 controls the execution. The processor 1101 is configured to execute the application program code stored in the memory 1102. For example, the code stored in the memory 1102 may be used to execute the data processing methods provided in FIG. 5 to FIG. 8B.

Specifically, the processor 1101 is configured to invoke the data and the program code in the memory to perform the following operations: receiving vehicle type indication information from a vehicle side through the communication interface 1103, where the vehicle type indication information indicates a type of a first vehicle; determining, based on the vehicle type indication information, a processing manner for perception data reported by the first vehicle; allocating an identification code to the first vehicle, where the identification code is associated with the processing manner; sending the identification code to the vehicle side through the communication interface 1103; receiving a perception data report message from the vehicle side through the communication interface 1103, where the perception data report message includes first perception data reported by the first vehicle and the identification code; and processing the first perception data in the processing manner associated with the identification code.

The processing manner includes: setting a confidence level of the first perception data to a first confidence level, where the first confidence level is associated with the identification code; or determining that a usage priority of the first perception data is a first priority, where the first priority is associated with the identification code.

The identification code uniquely identifies the first vehicle, and that the identification code is associated with the processing manner includes: storing a correspondence between the identification code and the processing manner.

The processing manner is a first type of processing manner in a plurality of types of processing manners, and that the identification code is associated with the processing manner includes:

The identification code indicates the first type of processing manner.

The vehicle type indication information includes at least one of the following content:
- attribute information of the first vehicle;
- holder information of the first vehicle;
- a model or a configuration parameter of a data collection apparatus in the first vehicle;
- a model or a configuration parameter of a data processing apparatus in the first vehicle; or
- a data type supported by the first vehicle for reporting.

The vehicle type indication information indicates that the first vehicle is a registered crowdsourcing data collection vehicle, and the vehicle type indication information includes at least one piece of the following information:
- a model of a crowdsourcing data collection unit;
- a model of a crowdsourcing data processing unit;
- a capability of the crowdsourcing data collection unit;
- a capability of the crowdsourcing data processing unit;
- an identifier of a company to which the first vehicle belongs;
- identity information of an individual to which the first vehicle belongs;
- an identifier of a manufacturer of the first vehicle; or
- a value generated between a cloud and the company according to a predefined rule.

The vehicle type indication information indicates that the first vehicle is a registered crowdsourcing data collection vehicle, the first confidence level is higher than a confidence level of perception data reported by an unregistered data collection vehicle, and the first priority is higher than a priority of the perception data reported by the unregistered data collection vehicle.

The first vehicle is an unregistered data collection vehicle, and the receiving vehicle type indication information from a vehicle side through the communication interface 1103 includes: receiving a registration request message from the vehicle side through the communication interface 1103, where the registration request message includes the vehicle type indication information.

It should be noted that, for functions of the data processing apparatus 110 described in this embodiment of this application, refer to related descriptions in the method embodiments in FIG. 5 to FIG. 8B. Details are not described herein again.

Figure 12:
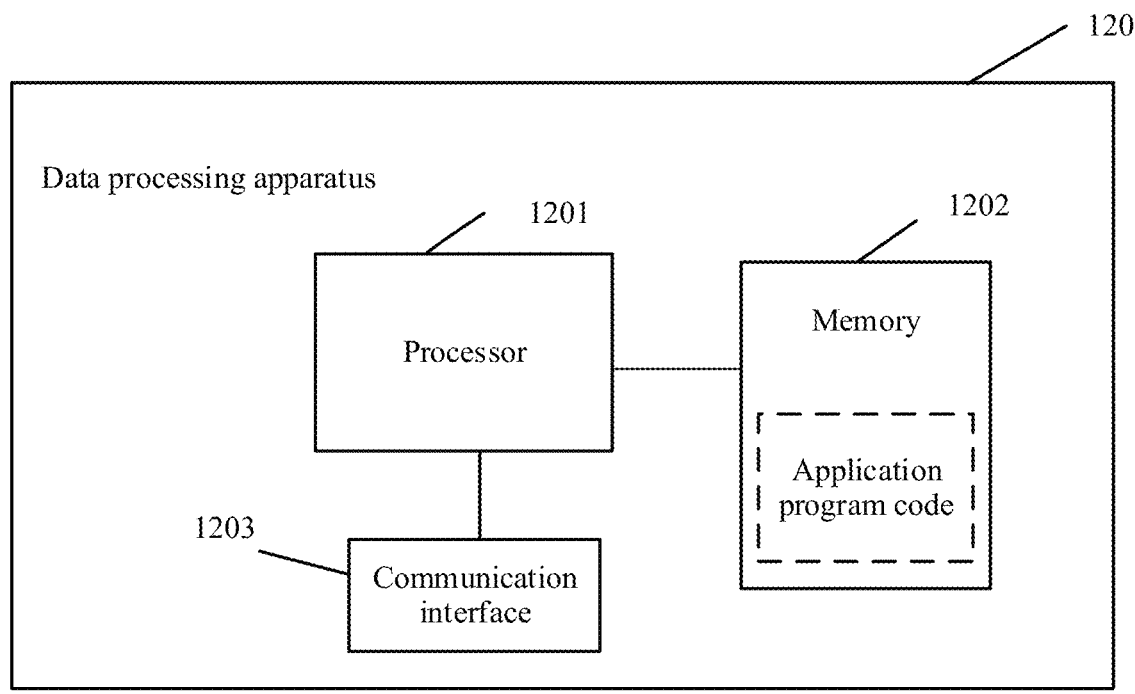
FIG. 12 is a schematic diagram of a structure of another data processing apparatus according to an embodiment of this application.

FIG. 12 is a schematic diagram of a structure a data processing apparatus according to an embodiment of this application. The data processing apparatus 120 includes at least one processor 1201 and at least one communication interface 1203. Optionally, the data processing apparatus 120 may further include at least one memory 1202. The data processing apparatus 120 may further include a general-purpose component such as an antenna. Details are not described herein. During actual application, based on solution 3 in scenario 1 and solution 4 and solution 5 in scenario 2 described in this application, the fourth aspect, and the sixth aspect, the data processing apparatus 120 may be a vehicle, or a component or a chip (for solution 3) in the vehicle, or may be a vehicle server, or a component or a chip in a vehicle service period (for solution 4 and solution 5).

The processor 1201 may be a general-purpose CPU, a microprocessor, an ASIC, or one or more integrated circuits configured to control program execution of the foregoing solution.

The communication interface 1203 is configured to communicate with another device or a communication network.

The memory 1202 may be a ROM or another type of static storage device capable of storing static information and instructions, a RAM or another type of dynamic storage device capable of storing information and instructions, or may be an EEPROM, a CD-ROM) or another optical disc storage, an optical disc storage (including a compact optical disc, a laser disc, an optical disc, a digital versatile optical disc, a Blu-ray optical disc, or the like), a magnetic disk storage medium, or another magnetic storage device, or any other medium that can carry or store expected program code in a form of an instruction or a data structure and can be accessed by a computer, but is not limited thereto. The memory may exist independently, and is connected to the processor through a bus. The memory may alternatively be integrated with the processor.

The memory 1202 is configured to store application code for executing the foregoing solution, and the processor 1201 controls the execution. The processor 1201 is configured to execute the application program code stored in the memory 1202. For example, the code stored in the memory 1202 may be used to perform the foregoing data processing method.

Specifically, the processor 1201 is configured to invoke the data and the program code in the memory to perform the following operations: sending vehicle type indication information to a server side through the communication interface 1203; receiving an identification code from the server side through the communication interface 1203, where the identification code is associated with a processing manner for perception data reported by a first vehicle; and sending a perception data report message to the server side through the communication interface 1203, where the perception data report message includes first perception data reported by the first vehicle and the identification code.

The processing manner includes: setting a confidence level of the first perception data to a first confidence level, where the first confidence level is associated with the identification code; or determining that a usage priority of the first perception data is a first priority, where the first priority is associated with the identification code.

The identification code uniquely identifies the first vehicle.

The processing manner is a first type of processing manner in a plurality of types of processing manners, and that the identification code is associated with a processing manner for perception data reported by a first vehicle includes:

The identification code indicates the first type of processing manner.

The vehicle type indication information includes at least one of the following content:
- attribute information of the first vehicle;
- holder information of the first vehicle;
- a model or a configuration parameter of a data collection apparatus in the first vehicle;
- a model or a configuration parameter of a data processing apparatus in the first vehicle; or
- a data type supported by the first vehicle for reporting.

The vehicle type indication information indicates that the first vehicle is a registered crowdsourcing data collection vehicle, and the vehicle type indication information includes at least one piece of the following information:

a model of a crowdsourcing data collection unit;
a model of a crowdsourcing data processing unit;
a capability of the crowdsourcing data collection unit;
a capability of the crowdsourcing data processing unit;
an identifier of a company to which the first vehicle belongs;
identity information of an individual to which the first vehicle belongs;
an identifier of a manufacturer of the first vehicle; or
a value generated between a cloud and the company according to a predefined rule.

The vehicle type indication information indicates that the first vehicle is a registered crowdsourcing data collection vehicle, the first confidence level is higher than a confidence level of perception data reported by an unregistered data collection vehicle, and the first priority is higher than a priority of the perception data reported by the unregistered data collection vehicle.

The first vehicle is an unregistered data collection vehicle, and the sending vehicle type indication information to a server side through the communication interface 1203 includes: sending a registration request message to the server side through the communication interface 1203, where the registration request message includes the vehicle type indication information.

It should be noted that, for functions of the data processing apparatus 120 described in this embodiment of this application, refer to related descriptions in the method embodiments in FIG. 5 to FIG. 8B. Details are not described herein again.

An embodiment of the present application further provides a computer storage medium. The computer-readable storage medium stores instructions, and when the instructions are run on a computer or a processor, the computer or the processor performs one or more steps in the method in any one of the foregoing embodiments. When implemented in a form of software functional units and sold or used as an independent product, the component modules of the apparatus may be stored in the computer-readable storage medium. Based on such an understanding, the technical solutions of this application essentially, or the part contributing to the conventional technology, or all or some of the technical solutions may be implemented in a form of a software product. The computer product is stored in the computer-readable storage medium.

The computer-readable storage medium may be an internal storage unit of the device in the foregoing embodiment, for example, a hard disk or memory. The computer-readable storage medium may also be an external storage device of the foregoing device, for example, an equipped plug-in hard disk, a smart media card (SMC), a Secure Digital (SD) card, or a flash card. Further, the computer-readable storage medium may alternatively include both the internal storage unit of the device and the external storage device. The computer-readable storage medium is configured to store the computer program and other programs and data that are used by the device. The computer-readable storage medium may be further configured to temporarily store data that has been output or is to be output.

A person of ordinary skill in the art may understand that all or some of the procedures of the methods in embodiments may be implemented by a computer program instructing related hardware. The computer program may be stored in a computer-readable storage medium. When the program runs, the procedures of the methods in embodiments may be performed. The foregoing storage medium includes any medium that can store program code, such as a ROM, a RAM, a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

It may be understood that a person of ordinary skill in the art may be aware that, units and algorithm steps in the examples described in embodiments disclosed with reference to embodiments of this application can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

A person skilled in the art can understand that functions described with reference to various illustrative logical blocks, modules, and algorithm steps disclosed in embodiments of this application may be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments according to this application, it should be understood that the disclosed system, apparatus, and method may be implemented in another manner. For example, the described apparatus embodiments are only examples. For example, division into the units is only logical function division or may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or a part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
   at least one memory configured to store instructions; and
   at least one processor coupled to the at least one memory and configured to execute the instructions to cause the apparatus to:
   receive vehicle type indication information from a vehicle side, wherein the vehicle type indication information indicates a type of a first vehicle;
   allocate an identification code to the first vehicle based on the vehicle type indication information, wherein the identification code is associated with a processing manner for first perception data from the first vehicle;
   send the identification code to the vehicle side;
   receive a perception data report message from the vehicle side, wherein the perception data report message comprises the first perception data and the identification code; and
   process the first perception data in the processing manner.

2. The apparatus according toof claim 1, wherein the processing manner comprises:
   setting a confidence level of the first perception data to a first confidence level, wherein the first confidence level is associated with the identification code; or
   determining that a usage priority of the first perception data is a first priority, wherein the first priority is associated with the identification code.

3. The apparatus of claim 1, wherein the identification code uniquely identifies the first vehicle, and wherein the at least one processor is further configured to execute the instructions to cause the apparatus to store a correspondence between the identification code and the processing manner.

4. The apparatus of claim 1, wherein the processing manner is a first type of processing manner in a plurality of types of processing manners, and wherein the identification code indicates the first type of processing manner.

5. The apparatus of claim 1, wherein the vehicle type indication information comprises at least one of:
   attribute information of the first vehicle;
   holder information of the first vehicle;
   a model or a configuration parameter of a data collection apparatus in the first vehicle;
   a model or a configuration parameter of a data processing apparatus in the first vehicle; or
   a data type supported by the first vehicle for reporting.

6. The apparatus of claim 1, wherein the vehicle type indication information indicates that the first vehicle is a registered crowdsourcing data collection vehicle, and wherein the vehicle type indication information comprises at least one of:
   a model of a crowdsourcing data collection unit;
   a model of a crowdsourcing data processing unit;
   a capability of the crowdsourcing data collection unit;
   a capability of the crowdsourcing data processing unit;
   an identifier of a company to which the first vehicle belongs;
   identity information of an individual to which the first vehicle belongs;
   an identifier of a manufacturer of the first vehicle; or
   a value generated between a cloud and the company according to a predefined rule.

7. The apparatus of claim 2, wherein the vehicle type indication information indicates that the first vehicle is a registered crowdsourcing data collection vehicle, wherein the first confidence level is higher than a confidence level of perception data from an unregistered data collection vehicle, and wherein the first priority is higher than a priority of the perception data.

8. The apparatus of claim 1, wherein the first vehicle is an unregistered data collection vehicle, wherein the at least one processor is further configured to execute the instructions to cause the apparatus to receive a registration request message from the vehicle side, and wherein the registration request message comprises the vehicle type indication information.

9. An apparatus, comprising:
   at least one memory configured to store instructions; and
   at least one processor coupled to the at least one memory and configured to execute the instructions to cause the apparatus to:
   send vehicle type indication information to a server side, wherein the vehicle type indication information indicates a type of a first vehicle;
   receive an identification code from the server side, wherein the identification code is based on the vehicle type indication information, wherein the identification code is associated with a processing manner for first perception data from the first vehicle; and
   send a perception data report message to the server side,
   wherein the perception data report message comprises the first perception data and the identification code.

10. The apparatus of claim 9, wherein the processing manner comprises:
    setting a confidence level of the first perception data to a first confidence level, wherein the first confidence level is associated with the identification code; or setting a usage priority of the first perception data to a first priority, wherein the first priority is associated with the identification code.

11. The apparatus according toof claim 9, wherein the identification code uniquely identifies the first vehicle.

12. The apparatus of claim 9, wherein the processing manner is a first type of processing manner in a plurality of types of processing manners, and wherein the identification code indicates the first type of processing manner.

13. The apparatus of claim 9, wherein the vehicle type indication information comprises at least one of:
   attribute information of the first vehicle;
   holder information of the first vehicle;
   a model or a configuration parameter of a data collection apparatus in the first vehicle;
   a model or a configuration parameter of a data processing apparatus in the first vehicle; or
   a data type supported by the first vehicle for reporting.

14. The apparatus of claim 9, wherein the vehicle type indication information indicates that the first vehicle is a registered crowdsourcing data collection vehicle, and wherein the vehicle type indication information comprises at least one of:
   a model of a crowdsourcing data collection unit;
   a model of a crowdsourcing data processing unit;
   a capability of the crowdsourcing data collection unit;
   a capability of the crowdsourcing data processing unit;
   an identifier of a company to which the first vehicle belongs;
   identity information of an individual to which the first vehicle belongs;
   an identifier of a manufacturer of the first vehicle; or
   a value generated between a cloud and the company according to a predefined rule.

15. The apparatus of claim 10, wherein the vehicle type indication information indicates that the first vehicle is a registered crowdsourcing data collection vehicle, wherein the first confidence level is higher than a confidence level of perception data from an unregistered data collection vehicle, and wherein the first priority is higher than a priority of the perception data.

16. The apparatus of claim 9, wherein the first vehicle is an unregistered data collection vehicle, wherein the at least one processor further configured to execute the instructions to cause the apparatus to send a registration request message to the server side, and wherein the registration request message comprises the vehicle type indication information.

17. A method, comprising:
   receiving vehicle type indication information from a vehicle side, wherein the vehicle type indication information indicates a type of a first vehicle;
   allocating an identification code to the first vehicle based on the vehicle type indication information, wherein the identification code is associated with a processing manner for first perception data from the first vehicle;
   sending the identification code to the vehicle side;
   receiving a perception data report message from the vehicle side, wherein the perception data report message comprises the first perception data and the identification code; and
   processing the first perception data in the processing manner.

18. The method of claim 17, wherein the processing manner comprises:
   setting a confidence level of the first perception data to a first confidence level, wherein the first confidence level is associated with the identification code; or
   determining that a usage priority of the first perception data is a first priority, wherein the first priority is associated with the identification code.

19. The method of claim 17, wherein the identification code uniquely identifies the first vehicle, and wherein the method further comprises storing a correspondence between the identification code and the processing manner.

20. The method of claim 17, wherein the processing manner is a first type of processing manner in a plurality of types of processing manners, and wherein the identification code indicates the first type of processing manner.

21. The method of claim 17, wherein the vehicle type indication information comprises at least one of:
   attribute information of the first vehicle;
   holder information of the first vehicle;
   a model or a configuration parameter of a data collection apparatus in the first vehicle;
   a model or a configuration parameter of a data processing apparatus in the first vehicle; or
   a data type supported by the first vehicle for reporting.

22. The method of claim 17, wherein the vehicle type indication information indicates that the first vehicle is a registered crowdsourcing data collection vehicle, and wherein the vehicle type indication information comprises at least one piece of:
   a model of a crowdsourcing data collection unit;
   a model of a crowdsourcing data processing unit;
   a capability of the crowdsourcing data collection unit;
   a capability of the crowdsourcing data processing unit;
   an identifier of a company to which the first vehicle belongs;
   identity information of an individual to which the first vehicle belongs;
   an identifier of a manufacturer of the first vehicle; or
   a value generated between a cloud and the company according to a predefined rule.

23. The method of claim 17, wherein the first vehicle is an unregistered data collection vehicle, and wherein receiving the vehicle type indication information from the vehicle side comprises receiving a registration request message from the vehicle side, and wherein the registration request message comprises the vehicle type indication information.

24. A method, comprising:
   sending vehicle type indication information to a server side, wherein the vehicle type indication information indicates a type of a first vehicle;
   receiving an identification code from the server side, wherein the identification code is based on the vehicle type indication information, wherein the identification code is associated with a processing manner for first perception data from the first vehicle; and
   sending a perception data report message to the server side, wherein the perception data report message comprises the first perception data and the identification code.

25. The method of claim 24, wherein the processing manner comprises:
   setting a confidence level of the first perception data to a first confidence level, wherein the first confidence level is associated with the identification code; or
   setting a usage priority of the first perception data to a first priority, wherein the first priority is associated with the identification code.

26. The method of claim 24, wherein the identification code uniquely identifies the first vehicle.

27. The method according to claim 24, wherein the processing manner is a first type of processing manner in a plurality of types of processing manners, and wherein the identification code indicates the first type of processing manner.

28. The method of claim 24, wherein the vehicle type indication information comprises at least one of:
   attribute information of the first vehicle;
   holder information of the first vehicle;
   a model or a configuration parameter of a data collection apparatus in the first vehicle;
   a model or a configuration parameter of a data processing apparatus in the first vehicle; or
   a data type supported by the first vehicle for reporting.

29. The method of claim 24, wherein the vehicle type indication information indicates that the first vehicle is a registered crowdsourcing data collection vehicle, and wherein the vehicle type indication information comprises at least one of:
   a model of a crowdsourcing data collection unit;
   a model of a crowdsourcing data processing unit;
   a capability of the crowdsourcing data collection unit;
   a capability of the crowdsourcing data processing unit;
   an identifier of a company to which the first vehicle belongs;
   identity information of an individual to which the first vehicle belongs;
   an identifier of a manufacturer of the first vehicle; or
   a value generated between a cloud and the company according to a predefined rule.

30. The method of claim 24, wherein the first vehicle is an unregistered data collection vehicle, and wherein sending the vehicle type indication information to the server side comprises sending a registration request message to the server side, and wherein the registration request message comprises the vehicle type indication information.

* * * * *

UNITED STATES PATENT AND TRADEMARK OFFICE
CERTIFICATE OF CORRECTION

PATENT NO. : 12,353,606 B2  
APPLICATION NO. : 18/344552  
DATED : July 8, 2025  
INVENTOR(S) : Jianqin Liu Page 1 of 1

It is certified that error appears in the above-identified patent and that said Letters Patent is hereby corrected as shown below:

In the Claims

Claim 2, Column 29, Line 57: "The apparatus according toof claim 1, wherein the" should read "The apparatus of claim 1, wherein the"

Claim 11, Column 31, Line 4: "The apparatus according toof claim 9, wherein the" should read "The apparatus of claim 9, wherein the"

Claim 16, Column 31, Line 44: "one processor further configured to execute the instructions" should read "one processor is further configured to execute the instructions"

Signed and Sealed this  
Second Day of September, 2025

Coke Morgan Stewart  
*Acting Director of the United States Patent and Trademark Office*